3,182,536
APPARATUS AND METHOD FOR SEVERING TOWELING AND THE LIKE INTO INDIVIDUAL LENGTHS
Charles B. Sumpter, Jr., Leaksville, and John T. MacIsaac, Jr., Spray, N.C., assignors to Fieldcrest Mills, Inc., Rockingham, N.C., a corporation of Delaware
Filed Nov. 2, 1962, Ser. No. 234,947
16 Claims. (Cl. 83—18)

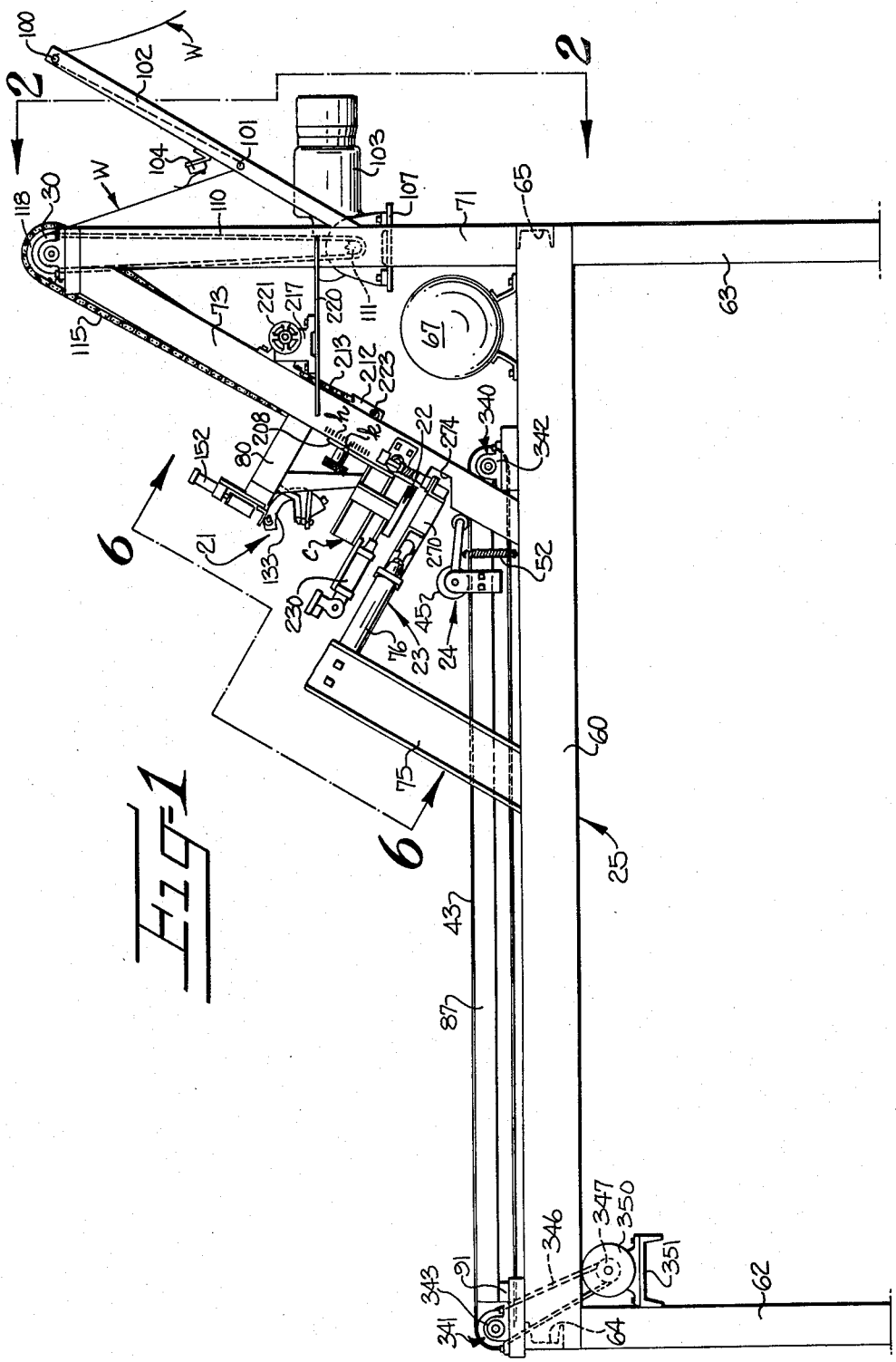

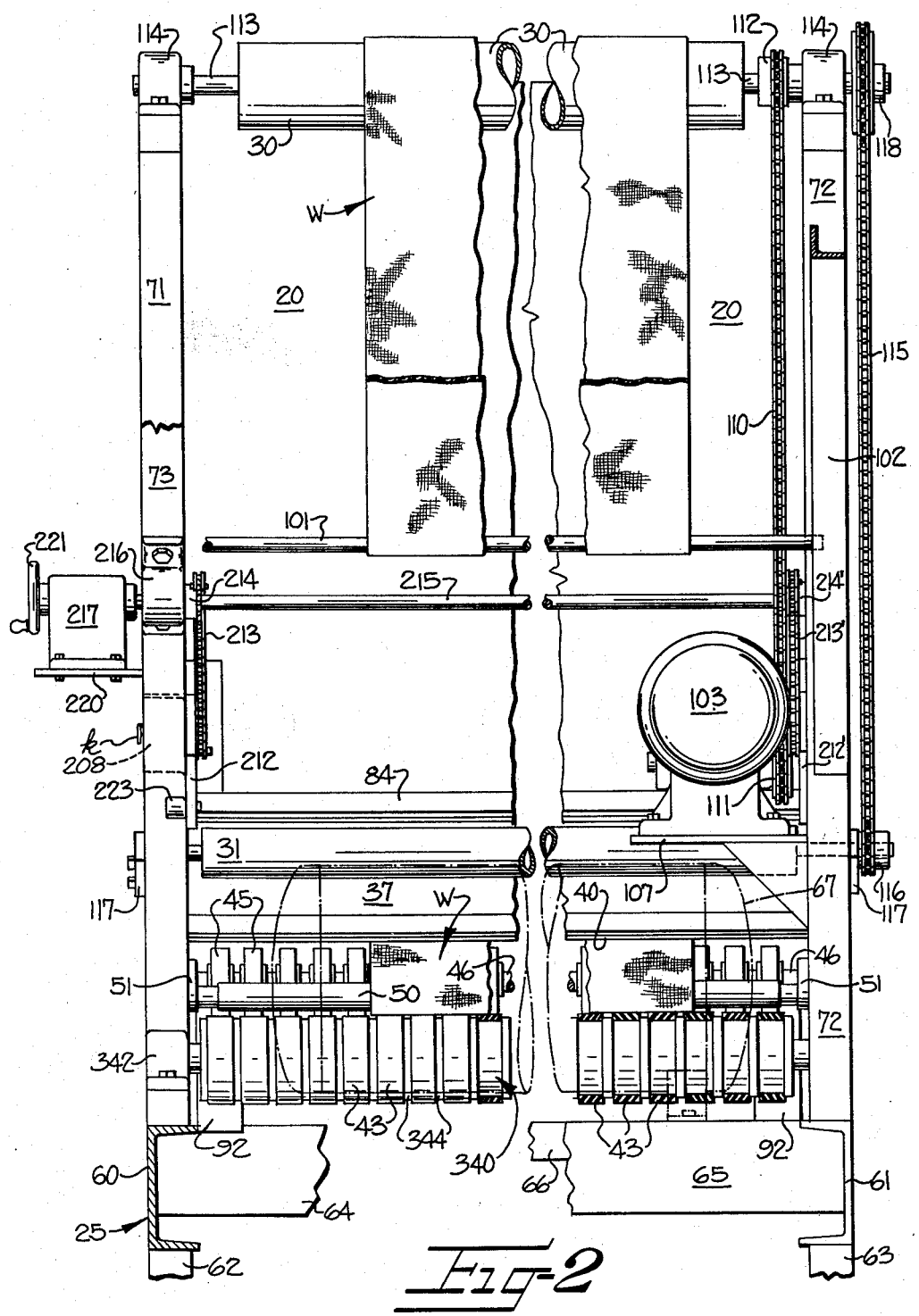

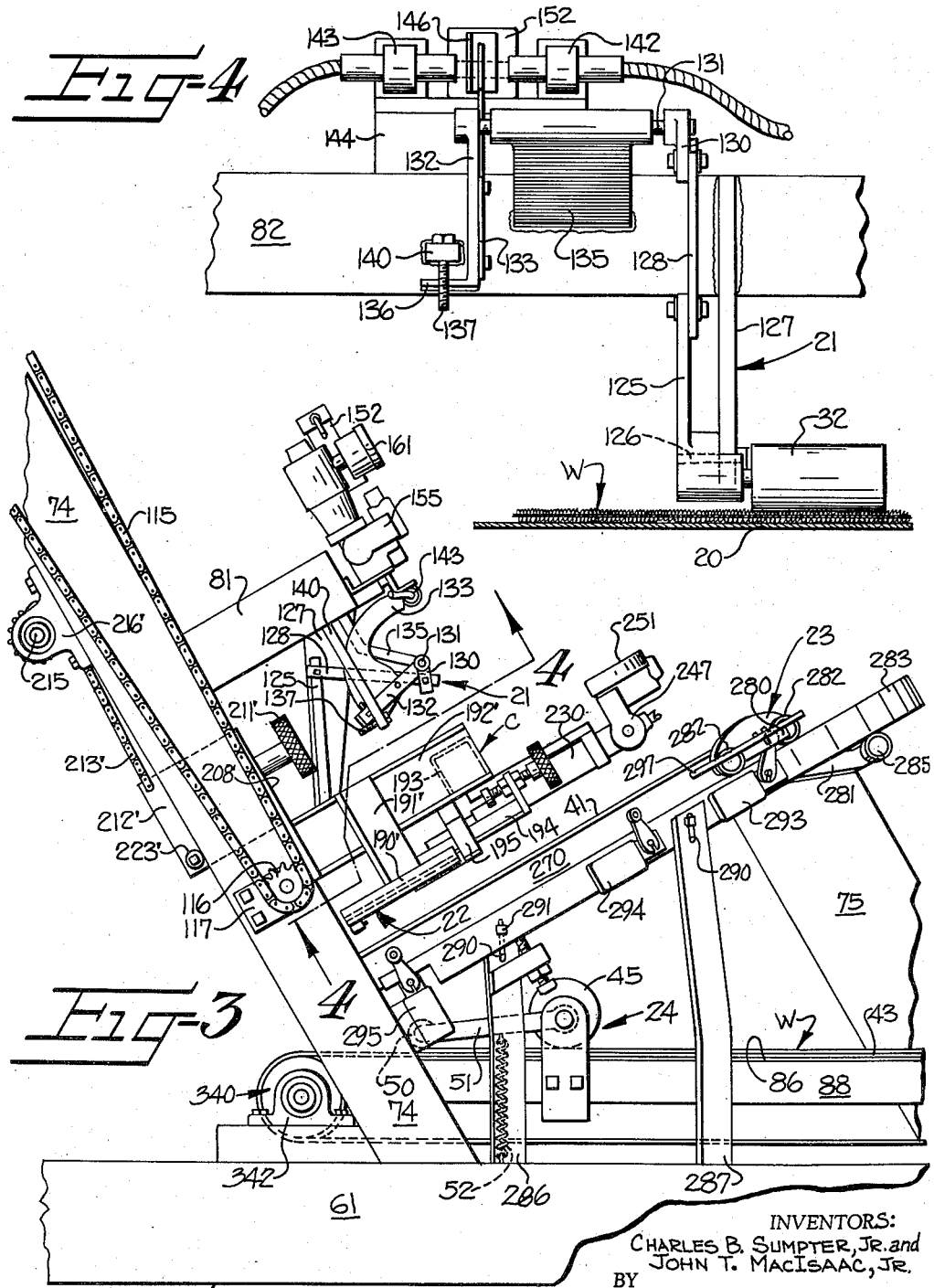

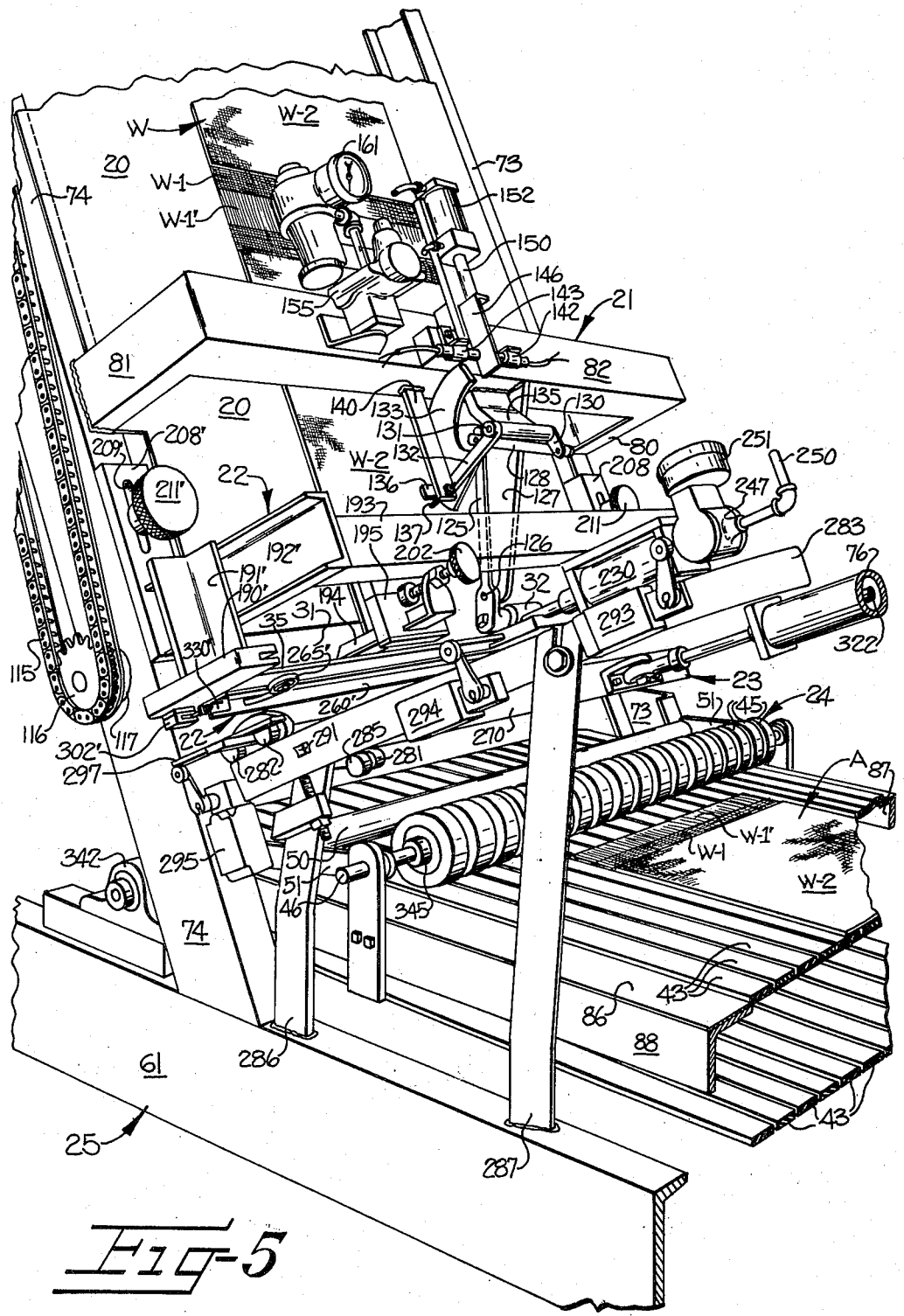

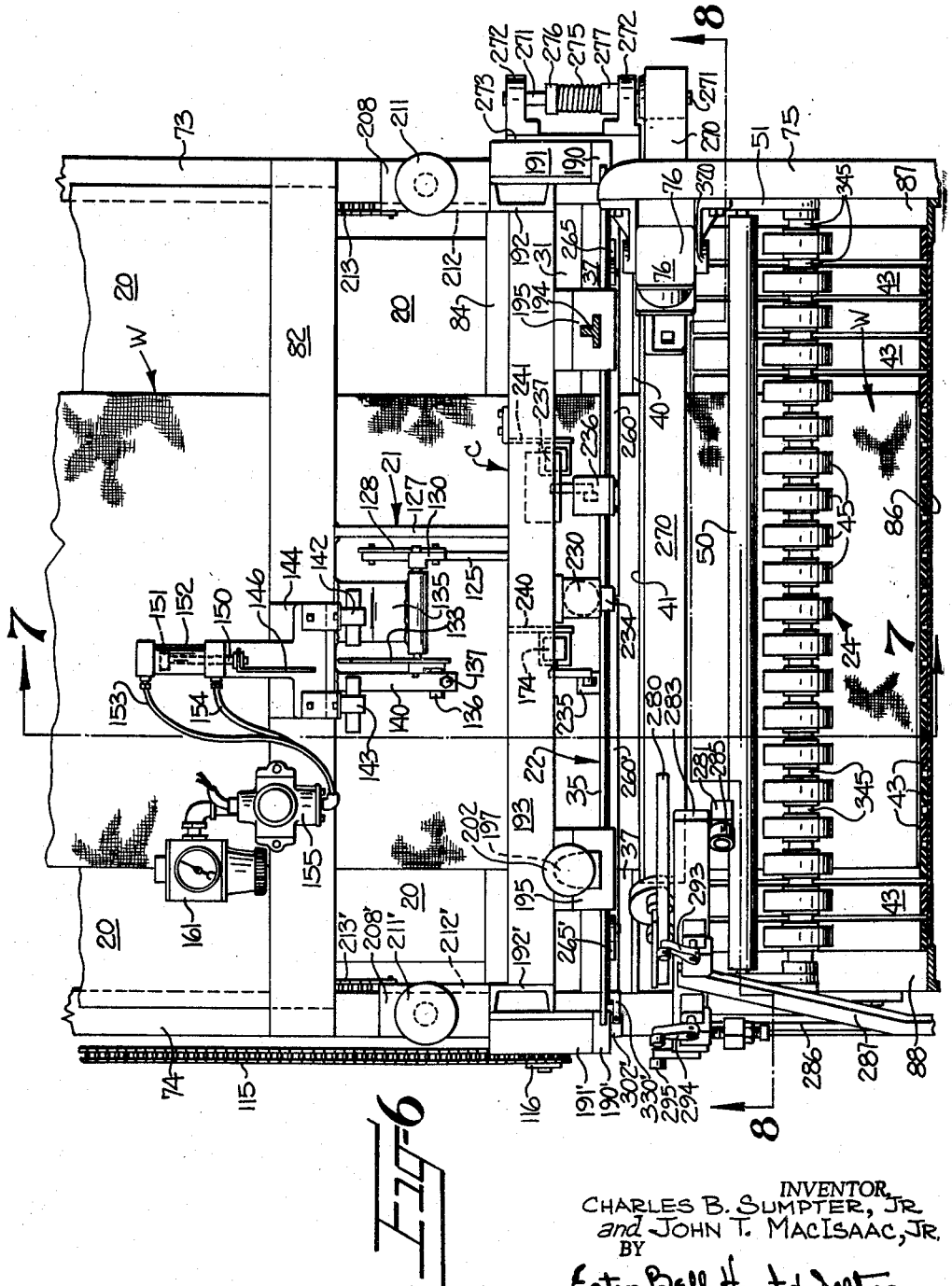

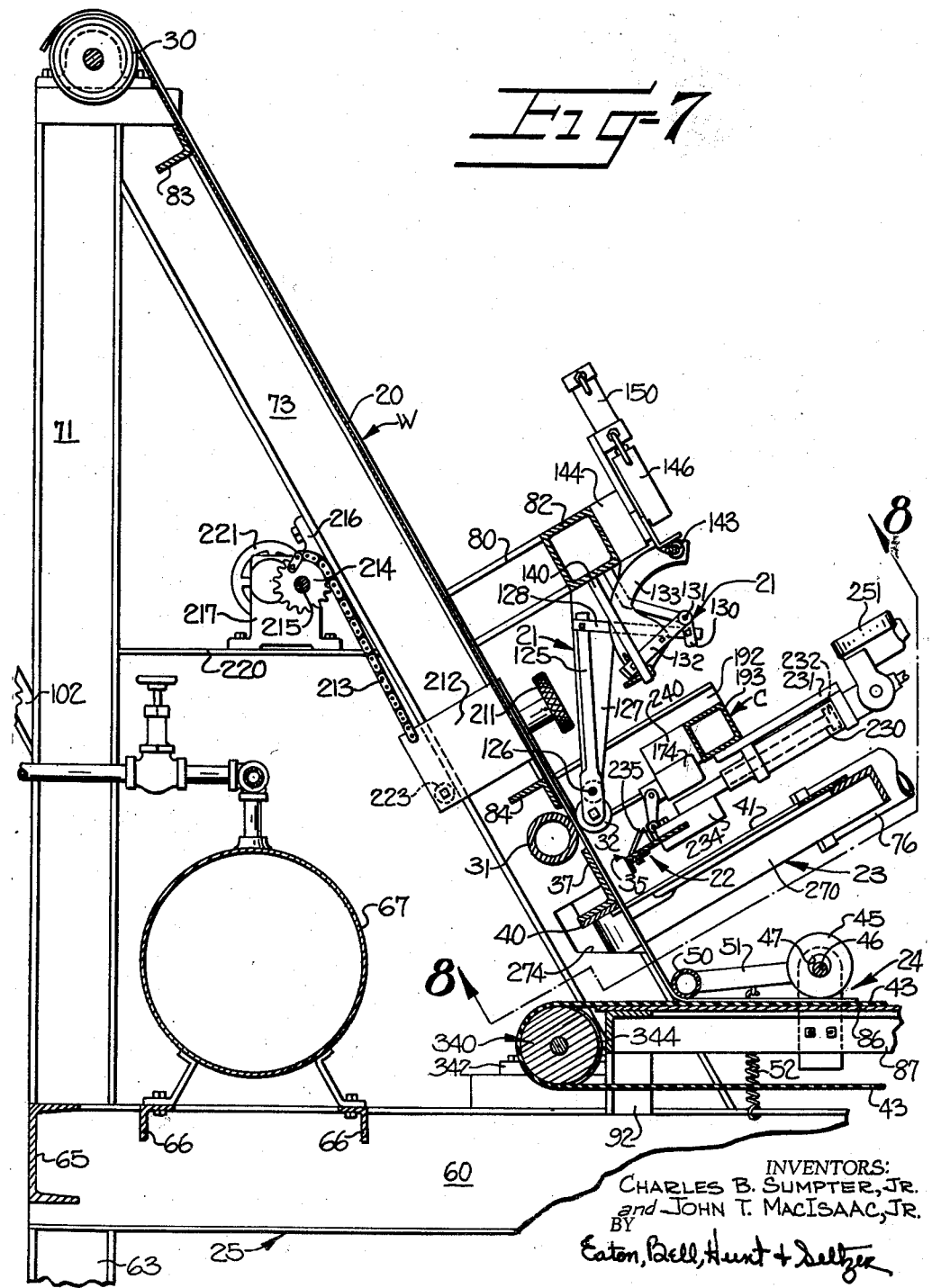

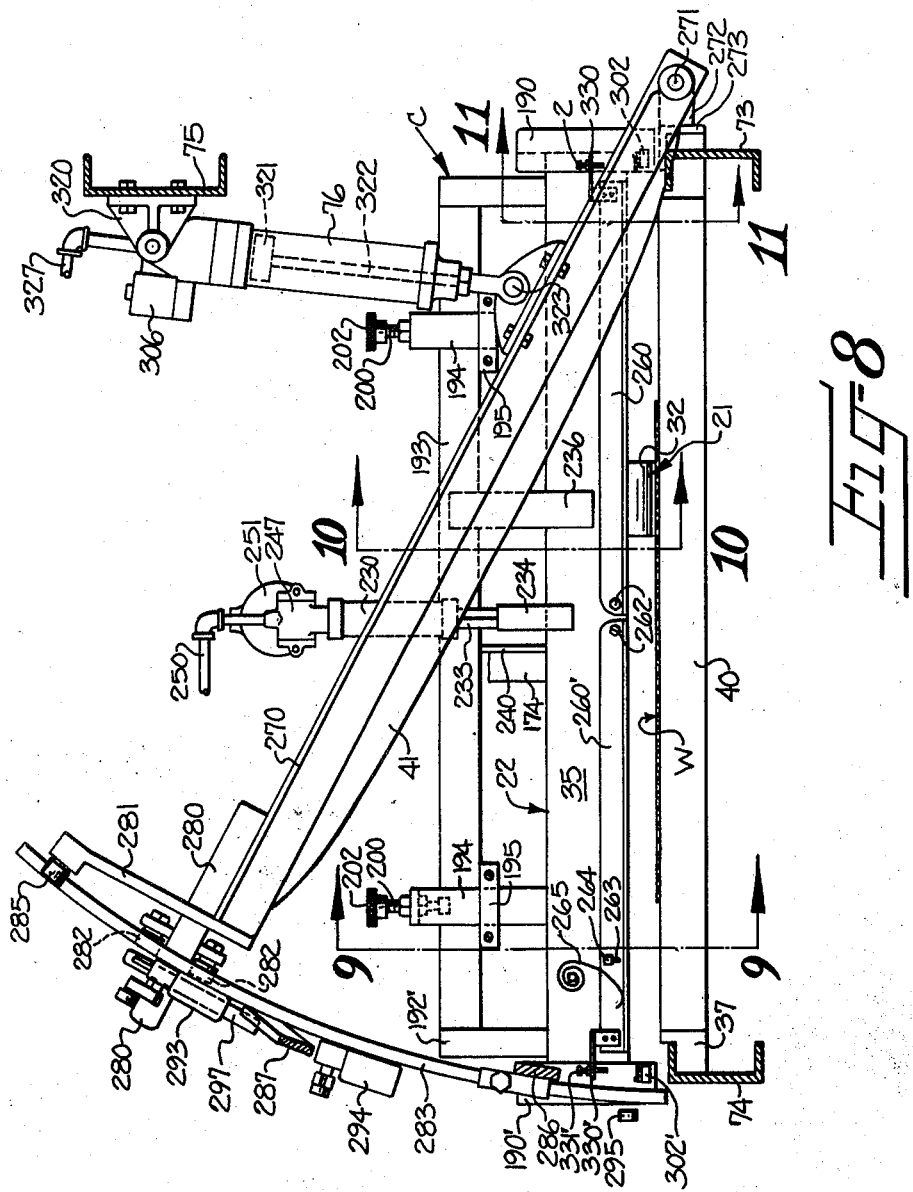

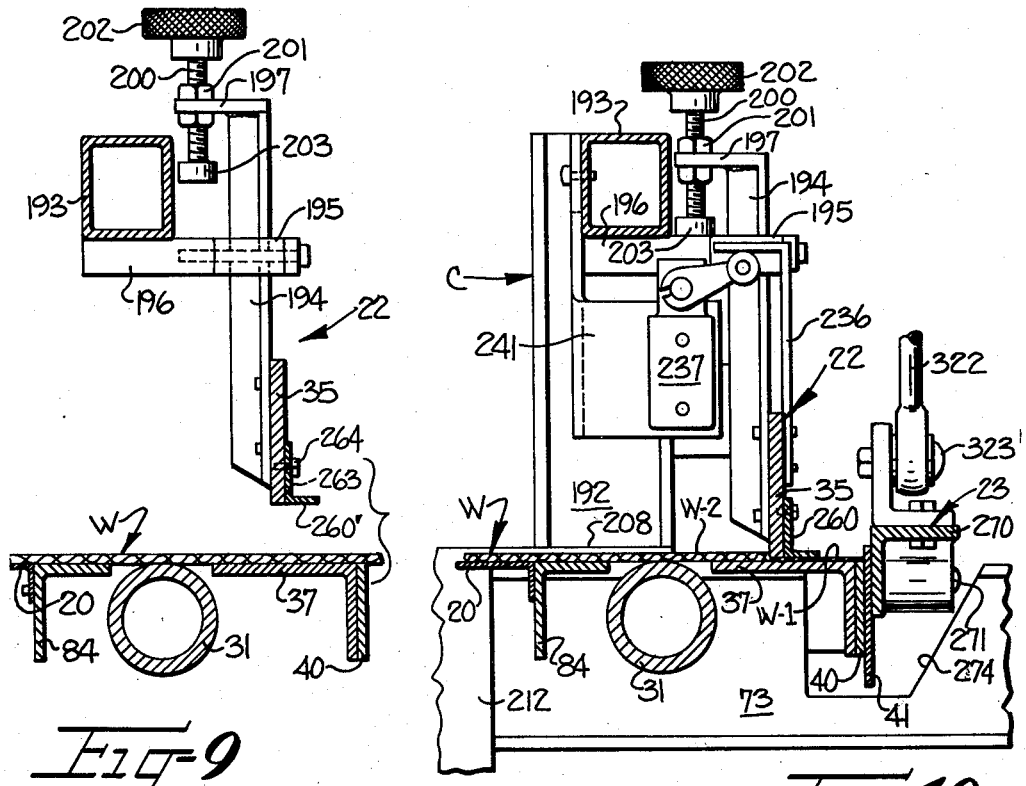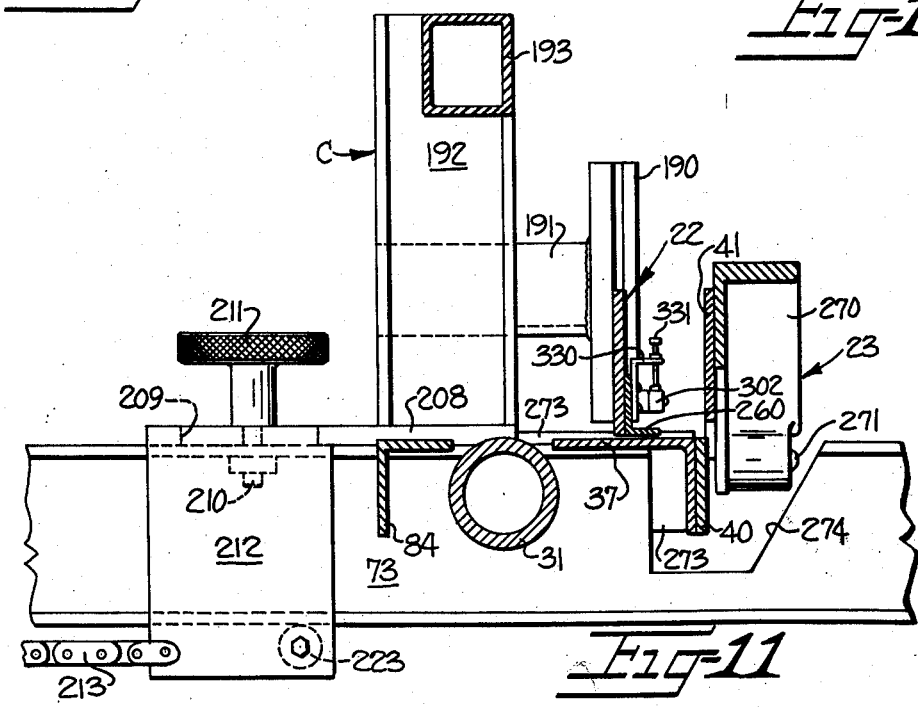

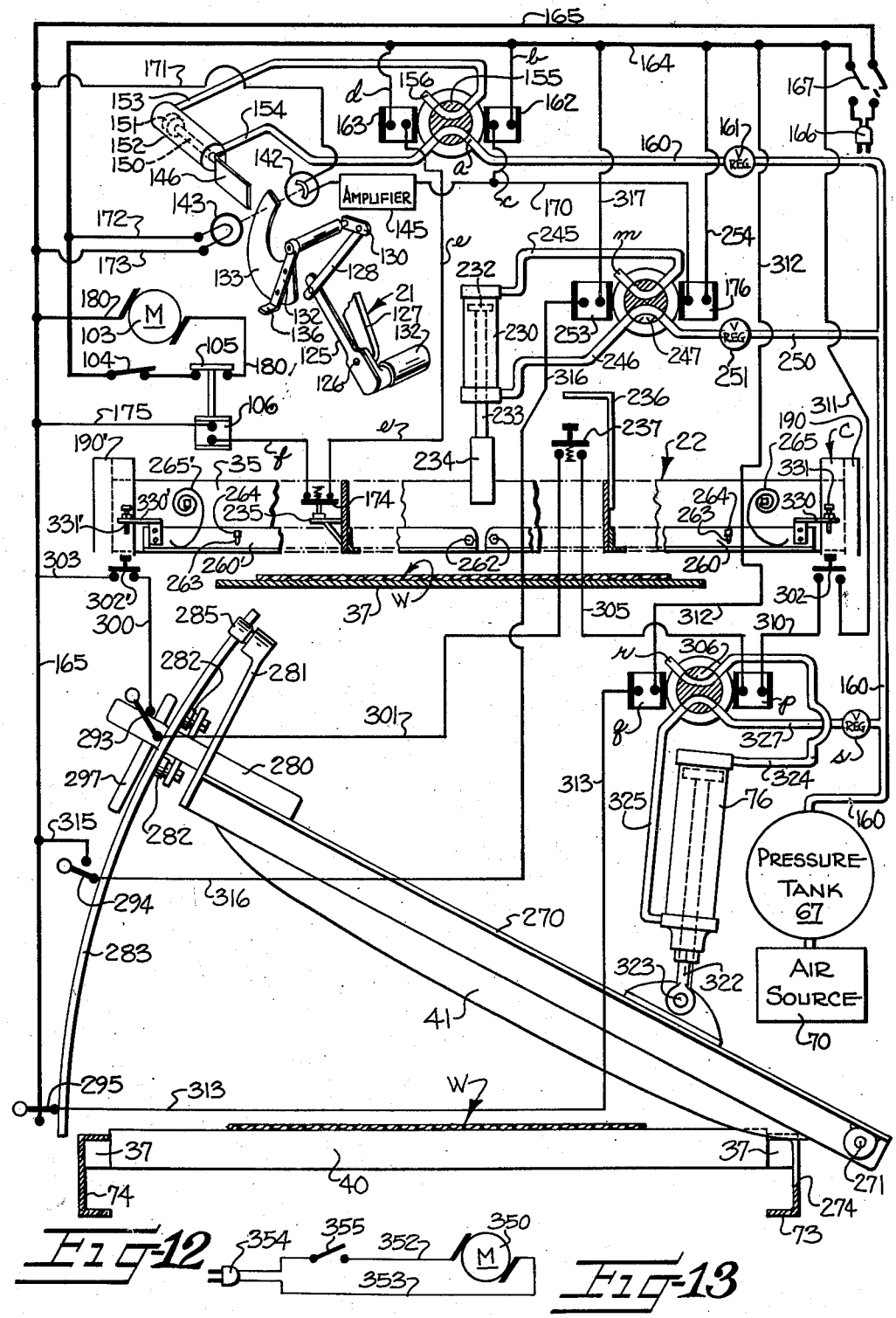

This invention relates to an improved method and apparatus for automatically severing continuous lengths of web material into individual pieces or articles and is particularly devised for severing towels and the like from a continuous length or lengths of toweling, the individual towels being defined by transverse bands or headers of different thickness than the main bodies of the towels.

As is well known, terry toweling is usually woven in continuous lengths to include spaced successive body portions of terry pile which are defined by transverse plain woven or non-terry bands or headers. The weaving of such toweling is usually pattern-controlled so the transverse bands are presumably woven at uniformly spaced intervals and, also, the transverse bands generally extend in straight perpendicular relation to the selvages of the fabric. However, when the fabric is removed from the loom, and especially when it is subjected to wet treatments thereafter, such as scouring and bleaching, this frequently produces a variation in the spacing of the transverse bands, and the bands will be bowed, irregular and/or angularly disposed relative to the longitudinal edges of the fabric. Such conditions are particularly noticeable in the manufacture of low-cost, lightweight commercial toweling.

Thus, it has long been the accepted practice for an operator to hand-cut the toweling into individual towels by directing a cutting device across the toweling exactly at the center of each band so the finished towels would have uniform margins of thin band sections at each end thereof. Obviously, this has been a tedious, time-consuming and expensive operation.

More recently, attempts have been made to perform this cutting operation by automatic devices. However, such prior devices have not been satisfactory to our knowledge because they were unable to straighten any bowed or angularly extending headers with the required degree of accuracy and they were unable to feed the toweling to extents varying solely in accordance with the spacing of successive headers. Photoelectric devices have been used to operate cutting elements for this purpose, but such devices have required that the web be treated to form transverse bands of contrasting materials or colors thereon, or they have relied on variations in light reflectivity to guide a cutting element across the corresponding portions of the web. Such photoelectric devices have been inaccurate and expensive to manufacture and maintain.

It is an object of this invention to provide an improved method and apparatus which overcomes these and other defects of the prior art cutting devices and wherein the present method includes the steps of directing forwardly a continuous web, such as toweling, having recurrent transverse portions of one given height or thickness and other transverse portions of greater height or thickness, in a given path of travel, engaging at least a portion of the leading edge of each successive greater height portion as the same reaches a predetermined point in its travel, then advancing forwardly any portions of said leading edge not previously transversely alined at said point until said leading edge extends in a substantially straight transverse line, and then severing the web transversely, preferably closely adjacent to said point, to separate an individual piece or towel from the web. Thus, the length of successive pieces cut from the web and the straightness of the cut pieces is solely dependent upon the location of the successive greater height portions and the point or points engaged by the leading edges of such greater height portions.

It is another object of this invention to provide apparatus for carrying out the above method including a normally inactive transverse stop bar spaced from the path of travel of the web with means responsive to the approach of a greater height portion on the web for moving the stop bar into the path of travel of the latter greater height portion to be engaged by the leading edge thereof, means for advancing forwardly any portions of the leading edge of said latter greater height portion, which are not initially transversely alined, against the rear surface of said stop bar to thereby straighten said leading edge, and means for severing the web transversely thereof.

In its preferred embodiment, the apparatus of the present invention includes a plurality of driven members or belts upon which the web rests forwardly of the stop bar, with a transverse row of freely rotatable presser rollers resting upon the web above said driven members and, when the stop bar moves into the path of travel of each transverse greater height portion on the web, it is spaced from the corresponding transverse web portion of said given height so the rollers advance only those corresponding portions of the web which are not obstructed by the stop bar. Upon further advancement of any portion of the web being interrupted by the stop bar, a severing device, preferably in the form of a transverse cutting blade or knife, passes through the web preferably at a point spaced forwardly of the rear surface of the stop bar a distance equal to one-half the width of the corresponding transverse given height portion of the web or toweling.

Some of the objects of the invention having been stated, other objects will appear as the description proceeds when taken in connection with the accompanying drawings, in which—

FIGURE 1 is a left-hand side elevation of a preferred embodiment of the novel apparatus for carrying out the method of the present invention;

FIGURE 2 is an enlarged rear elevation of the upper portion of the apparatus, with parts broken away, and being taken looking substantially along line 2—2 in FIGURE 1;

FIGURE 3 is an enlarged fragmentary elevation looking at the opposite side of the central portion of FIGURE 1;

FIGURE 4 is an enlarged fragmentary elevation taken substantially along line 4—4 in FIGURE 3 showing a preferred embodiment of the transverse band detecting device in the position occupied thereby when the feeler or detector roller thereof is in registration with a relatively thick portion or terry pile area of the web material or toweling;

FIGURE 5 is a view similar to FIGURE 3, but showing the various parts in perspective, and showing some parts which have been omitted from FIGURE 3 for purposes of clarity;

FIGURE 6 is an enlarged fragmentary elevation looking downwardly and rearwardly at an angle substantially perpendicular to the path of travel of the web material as it is being fed to the detecting, straightening and severing means, and being taken looking substantially along line 6—6 in FIGURE 1;

FIGURE 7 is an enlarged fragmentary vertical sectional view similar to the elevation of FIGURE 3, but being taken substantially along line 7—7 in FIGURE 6;

FIGURE 8 is an elevation of the severing device taken substantially along line 8—8 in FIGURES 6 and 7 and showing the cutting blade in raised or inoperative position;

FIGURES 9, 10 and 11 are enlarged fragmentary vertical sectional views taken substantially along the respective lines 9—9, 10—10 and 11—11 in FIGURE 8, showing the pile stop bar 35 and cutting blade 41 in different positions, and wherein the corresponding portions of the feed platform are shown in horizontal position, for purposes of clarity, although the feed platform actually occupies an inclined position as shown in FIGURES 5 and 7;

FIGURE 12 is a diagram of electrical and fluid pressure circuits in association with various operating elements of the apparatus, which elements are shown schematically;

FIGURE 13 is a diagram of an electrical circuit for controlling the discharge conveyor drive of the machine.

*Brief synopsis of the machine*

The preferred embodiment of the apparatus of the present invention generally comprises a downwardly and forwardly inclined web feed platform 20 (FIGURES 5 and 7), a band detecting device 21, a high surface intercepting device 22, a severing device 23, and an auxiliary web advancing device 24, all of which are preferably, but not necessarily, generally serially arranged in that order and in the direction of travel of the web W and individual articles or pieces A severed therefrom. All of the devices 21–24 and feed platform 20 are carried by a frame generally designated at 25.

The web W is shown in the form of a continuous terry toweling material having substantially spaced recurrent defining lines in the form of thin transverse portions or bands W–1 which, in the case of toweling, are generally in the form of relatively thin plain woven or non-terry areas and between which relatively thick or high portions W–2 are provided, such portions W–2 being in the form of raised terry pile or terry areas in the case of toweling. In this instance, the medial portion of the relatively thin transverse band W–1 in FIGURE 5 is shown with a non-woven transverse warp-yarn fringe area W–1' which, when severed transversely along the center thereof forms a fringe on either end of the corresponding towels or articles severed from the main portion of the web W.

For purposes of description, it may be assumed that each of the transverse bands W–1 between adjacent terry areas W–2 is simply a plain woven or non-terry area in the case of the web W being a toweling material. However, the fringe area is shown to illustrate the fact that the present apparatus will readily and accurately sever such areas at any desired location and throughout the width of the web W.

It will be observed in the right-hand portion of FIGURE 1 that the web W is drawn from a suitable source, not shown, by means of an intermittently driven main web feed roll 30, upwardly and over which web W passes. The main feed roll 30 directs the web W downwardly onto the inclined web feed platform 20, the inclination of which should be such that the web W will move downwardly and forwardly upon platform 20 by gravity, although the web W is normally pulled downwardly at a point spaced substantially from main feed roll 30 by an intermittently driven secondary web feed roll 31 (FIGURE 7) located adjacent the band detecting device 21 and over and in engagement with which the fabric or web W normally passes.

Secondary roll 31 rotates whenever main feed roll 30 rotates and preferably has a slightly greater surface speed than that of the main feed roll 30 so as to lightly tension the web W as it is being advanced between rolls 30, 31. The lower or front edge of inclined platform 20 terminates adjacent to and rearwardly of the portion of roll 31 which is engaged by web W.

The band detecting device 21 includes a feeler element in the form of a detector roller 32 (FIGURES 3, 4 and 7) which rests upon web W opposite from secondary feed roll 31. Roller 32 is normally held in a raised position by engagement with a thick portion or terry area W–2 of web W during the feeding of the web by feed rolls 30, 31.

When a relatively thin portion or band W–1 of web W moves into registration with detector roller 32, it is apparent that roller 32 may move downwardly to engage the corresponding band W–1. In so doing, detector roller 32 causes a transverse pile stop bar 35 (FIGURES 3, 5, 7 and 8–11) of the high surface intercepting device 22 to move from a normally inoperative or raised position, spaced outwardly of the path of travel of web W, to a position in close proximity to the upper or outer surface of the relatively thin band W–1, by means to be later described.

As stop bar 35 moves to the operative position last described, it also moves into the path of travel of the succeeding high portion or terry area W–2 of web W. Rotation of the web feed rolls 30, 31 then ceases. It should be noted that, since the lower or forward edge of web feed platform 20 terminates in spaced relation to the periphery of secondary feed roll 31, a secondary inclined platform 37, shown in the form of an angle bar in FIGURES 7, 9, 10 and 11, is positioned forwardly of the upper periphery of secondary feed roll 31.

The upper surface of secondary platform 37 is preferably alined with the upper surface of the main web feed platform 20. Thus, web W is supported both forwardly and rearwardly of secondary feed roll 31 and in a plane corresponding to the perpendicular plane of the stop bar 35 with respect to the path of travel of web W. The lower front portion of secondary platform 37 also serves as a support for a fixed cutting blade or cutting blade guide 40 which is a part of the severing device 23 to be later described. Severing device 23 also includes a transverse movable cutting blade 41 which is normally spaced above or outwardly of the path of travel of web W.

Although feed rolls 30, 31 are stopped at the time that stop bar 35 moves to the active position heretofore described (see FIGURES 10 and 11) the auxiliary web advancing device 24 serves to advance web W until the leading edge of the terry W–2 area then defining the rear edge of the corresponding thin band W–1 adjacent which the stop bar 35 is entirely positioned against the rear surface of stop bar 35. In the event that the latter leading edge is biased, or extends in an irregular line and/or is bowed or skewed, the auxiliary web advancing device 24 serves to advance individual portions of the web throughout the width thereof to insure that said leading edge of the thickened portion or terry pile area W–2 is entirely straightened against stop bar 35.

To this end, it will be observed in FIGURE 7 that the auxiliary web advancing device 24 comprises a plurality of closely spaced, relatively narrow, and endless conveyor belts 43 which extend longitudinally of frame 25 and parallel with the direction of travel of the web W. The conveyor belts 43 are continuously driven at a relatively high speed relative to the surface speed of main feed roll 30, and the upper runs thereof are disposed in a substantially horizontal plane spaced a substantial distance beneath the leading edge of secondary web feed platform 37 and the upper forward edge of fixed blade 40.

The upper forward edge of fixed blade 40 should be positioned closer to the upper runs of conveyor belts 43 than the length of the shortest article A to be severed from web W so that the front edge of web W will drop onto the upper runs of belts 43 following the severing of each successive article A therefrom and before a succeeding article is severed therefrom. Also, the length of each successive article should preferably be sufficient so that the belts 43 will advance the front portion of the web to where it will be engaged by a plurality of floating presser members shown in the form of a transverse row of closely spaced presser rollers 45 in FIGURES 1, 2, 3, 5, 6 and 7.

The presser rollers 45 are loosely mounted on a common transverse shaft 46, which extends through relatively large axial holes 47 formed in presser rollers 45 so that each presser roller 45 may be raised and lowered independently of the others and relative to shaft 46. A web guide roll 50 of light-weight construction is spaced rearwardly of presser rollers 45 and extends transversely of and above the runs of belts 43 with its periphery preferably being disposed in substantially tangential alinement with the upper surface of the auxiliary web feed platform 37. Opposed ends of web guide roll 50 are mounted on the rear ends of arms 51 whose forward ends are pivotally mounted on shaft 46.

Guide roll 50 insures that the web W extends in parallel relation to and in engagement with belts 43 in advance of presser rollers 45 so that any resistance to movement of the web effected by frictional engagement of the web with platforms 20, 37 will not tend to raise any of the presser rollers 45. At least one of the arms 51 is urged downwardly by a tension spring 52 whose upper end is connected to the latter arm and whose lower end is connected to frame 25 (FIGURES 1, 3 and 7).

There is preferably one of the presser rollers 45 disposed above the upper run of each endless belt 43 and it is apparent that those presser rollers 45 which span the width of the web W are raised by the web W so that closely spaced narrow longitudinal portions of the web and successive articles A severed therefrom are independently yieldably urged toward the respective endless belts 43, although the belts 43 slip past web W until each successive article A is severed therefrom and thus released to move with the belts 43. Although the successive articles A may advance with the upper runs of the belts 43, the presser rollers 45 have the important function, in cooperation with the endless belts 43, of advancing respective portions of the web W so that any portions of the leading edge of each successive terry pile area W-2 which are not transversely alined and disposed in engagement with the rear surface of stop bar 35 are advanced until such leading edge portions are transversely alined in engagement with the rear surface of said stop bar 35. Thus, the leading edge of each successive thickened portion or terry pile area W-2, defining the rear edge of the thin band W-1 then in registration with stop bar 35, will then extend in a substantially straight transverse line.

To explain further, each of the presser rollers 45 exerts a yielding pressure against the corresponding longitudinal portion of the web W and causes such longitudinal portion to be yieldably urged against the upper run of the corresponding belt 43 so that, upon any portion of the leading edge of a terry pile area W-2 moving into engagement with the rear surface of stop bar 35, the corresponding portion of the web W remains stationary and the corresponding belt or belts 43 still slip in engagement with and move relative to the lower surface of the corresponding portion or portions of the web W.

However, any portion or portions of the leading edge of the corresponding terry pile area W-2 which may not have then moved into engagement with the rear surface of stop bar 35 are advanced by engagement with the corresponding longitudinally alined roller or rollers 45 with the web W until the entire length of the latter leading edge of the corresponding terry pile area W-2 is positioned against the rear surface of stop bar 35. Thereupon, all the rollers then in engagement with web W become stationary and the corresponding belts 43 simply move relative to the web W without imparting forward movement thereto. Due to the high speed of conveyor belts 43, the straightening of each band W-1 is effected almost instantaneously following movement of stop bar 35 to active position. After the full length of the leading edge of the corresponding terry pile area W-2 has engaged the rear surface of stop bar 35, the movable cutter blade 41 of severing device 23 is actuated to move downwardly through the web preferably at a point corresponding to the center line of the corresponding band W-1.

Although the stop bar 35 of intercepting device 22 is not moved longitudinally of the apparatus during operation thereof, means are provided for manually adjusting the intercepting device 22 relative to severing device 23 and, since all the transverse bands W-1 in a continuous length of toweling are of the same width, it follows that the relative positions of the intercepting device 22 and the severing device 23 may be such that each successive band W-1 of web W is severed transversely along the center line thereof.

After each successive article A is severed from the main web W in the manner heretofore described, the article A severed from the web is advanced by the belts 43, movable cutter blade 41 of severing device 23 returns to inoperative or raised position, movable stop bar of intercepting device 22 withdraws to inoperative or raised position and web feed rolls 30, 31 start rotating to again advance the web W until a succeeding transverse band W-1 thereon is detected to effect a repeat cycle in the operation of the apparatus.

The frame

The frame comprises longitudinally extending laterally spaced left-hand and right-hand main side frame members 60, 61 whose front and rear ends are supported on legs 62, 63 and whose front ends are interconnected by a front transverse frame member 64 (FIGURE 1). The rear ends of side frame members 60, 61 are interconnected by transverse frame member 65 (FIGURES 1, 2 and 7), and a pair of transverse frame members 66 (FIGURE 7) also extends between side frame members 60, 61 for supporting thereon a suitable fluid pressure tank 67 connected to a suitable source of fluid pressure identified as an air source 70 in FIGURE 12.

The lower ends of left-hand and right-hand upright frame members or posts 71, 72 are suitably secured to the rear end portions of longitudinal frame members 60, 61, and the upper ends of a pair of laterally spaced downwardly and forwardly inclined platform side rails 73, 74 are fixed to the upper ends of posts 71, 72. Opposed edge portions of the main web feed platform 20 are suitably secured to side rails 73, 74. The lower ends of side rails 73, 74 are suitably secured to the main frame members 60, 61. The main longitudinal side frame member 60 also has the lower end of an upwardly and rearwardly inclined frame member 75 suitably secured thereto and spaced forwardly from the lower end of side rail 73, for supporting the upper forward end of a fluid pressure cylinder 76 thereon. The cylinder 76 is a part of the severing device 23 as will be later described.

As best shown in FIGURE 5, the inclined platform side rails 73, 74 have the lower ends of relatively short side frame members 80, 81' suitably secured thereto and extending in right angular relation thereto. The upper ends of frame members 80, 81 have opposite ends of a detector support bar or frame member 82 suitably secured thereto. Frame member 82 is spaced outwardly of the path of travel of web W and is a part of the band detecting device 21.

Referring to FIGURE 7, it will be observed that the upper and lower portions of main web feed platform 20 are supported on transverse frame members 83, 84 which span the distance between and are suitably secured to the inclined side rails 73, 74. Opposed ends of auxiliary web feed platform 37 are also suitably secured to side rails 73, 74.

Since the endless belts 43 are relatively narrow and are necessarily made from a thin pliable material, such as leather, and the upper runs thereof must be maintained straight or on a given level relative to the shaft 46 on which presser rollers 45 are mounted, the upper runs of belts 43 are supported on a smooth guide plate 86 which is preferably made from sheet metal. Opposed side portions of plate 86 are suitably secured to auxiliary longitudinally extending side frame members 87, 88 (FIGURES 1, 3, 5, 6 and 7) whose distal surfaces are shown substantially in alinement with the vertical plane of the proximal surfaces of the main side frame members 60, 61. Opposed ends of frame members 87, 88 are suitably secured to front and rear posts 91, 92 (FIGURES 1, 2 and 7) fixed to and projecting upwardly from the corresponding main longitudinal side frame members 60, 61.

*Main web feed*

As heretofore stated, the continuous web W is fed to the apparatus by a main feed roll 30, assisted by an auxiliary feed roll 31. In its course to the main feed roller 30 from a suitable source of supply, the web W passes upwardly over an upper web guide rod 100 (FIGURE 1) and then forwardly and downwardly, beneath a lower web guide rod 101 and then upwardly and over main web feed roll 30. Guide rods 100, 101 may be suitably supported on a pair of upwardly and rearwardly inclined frame members 102 suitably secured to the side posts 71, 72 (FIGURES 1, 2 and 7). The main feed roll 30 is driven by an electric motor 103 whose operation is partially controlled by a normally open web detecting switch 104 (FIGURES 1 and 12) positioned rearwardly of the main feed roll 30. Motor 103 is also controlled by a switch 105 of a relay 106 which is, in turn, controlled by the position of stop bar 35 of intercepting device 22, in a manner to be later described.

As shown in FIGURE 1, the housing of web detecting switch 104 is carried by a bracket 106 suitably secured to one of the inclined frame members 102. The actuator of switch 104 bears against the web W at a point between guide rod 101 and feed roll 30 so that it is held in closed position as long as a portion of the web is positioned thereagainst, but moves to the normally opened position in the absence of a portion of the web extending between guide rod 101 and main feed roll 30.

Motor 103 is preferably of the gear-reduction type and is mounted on a suitable motor support 107 carried by post 72 (FIGURES 1 and 2). Motor 103 is connected to main feed roll 30 by means of an endless sprocket chain 110 mounted on a sprocket wheel 111 driven by motor 103. Sprocket chain 110 is also mounted on a sprocket wheel 112 fixed on a shaft 113 on which main drive roller 30 is fixedly mounted. Shaft 113 is journaled in suitable bearings 114 fixed on the upper ends of posts 71, 72.

As heretofore stated, the auxiliary web feed roll 31 is driven to rotate whenever main web feed roller 30 rotates. Accordingly, it will be observed in the right-hand portion of FIGURE 2 that one end of shaft 113 has a sprocket wheel 118 fixed thereon which is engaged by an endless sprocket chain 115. Sprocket chain 115 also engages a relatively small sprocket wheel 116 fixed on one reduced end portion of the auxiliary web feed roll 31. Opposed reduced end portions of web feed roll 31 are journaled in suitable bearings 117 (FIGURES 1 and 3) carried by the inclined platform side rails 73, 74.

*Band detecting device*

As heretofore stated, the band detecting device 21 serves to detect the presence of low and high places in the web, such as the bands W-1 and terry pile areas W-2, as they move past a particular point in the path of travel of web W. In this instance, the detector roller 32 is normally held in an elevated position as successive terry pile areas W-2 move in engagement therewith and over the secondary feed roll 31. On the other hand, as each successive thin portion or band W-1 on web W moves into registration with detector roller 32, roller 32 may then move downwardly or toward the secondary or auxiliary web feed roller 31. In this instance, the detector roller 32 is maintained in engagement with the upper surface of web W by gravity, although it is apparent that suitable spring means may also be provided for this purpose.

In its preferred embodiment, detector roller 32 is journaled on the free end of a lever 125 pivotally connected, as at 126 (FIGURES 4 and 7), to a rigid arm 127 which extends upwardly and is suitably secured to the transverse frame member 82 heretofore described. It will be noted that the pivot point 126 of lever 125 is disposed closely adjacent the lower end thereof and closely adjacent detector roller 32 while the remaining portion of lever 125 is relatively long, so that relatively slight movement of roller 32 imparts considerably more movement to the upper end of lever 125.

The upper end of lever 125 has a link 128 pivotally connected thereto and extending upwardly and forwardly therefrom at an angle. The upper or forward end of link 128 is pivotally connected to one end of a relatively short crank arm 130 fixed on one end of a pivot shaft 131 (FIGURE 3). The other end of shaft 131 also has a crank 132 fixed thereon to which one end of an arcuate shield 133 is suitably secured.

Pivot shaft 131 is journaled in a bearing 135 which extends rearwardly and upwardly and is suitably secured to the transverse frame member 82. It is apparent that relatively slight movement of detector roller 32 in either direction relative to secondary feed roll 31 imparts considerable movement to shield 133, which shield may also be termed as a switch actuator. In order to prevent excessive bouncing of shield 133 whenever a high portion or terry pile portion W-2 on web W moves out of engagement with detector roller 32 and permits detector roller 32 to move downwardly into engagement with a transverse band W-1, the free end of crank arm 132 has a lateral portion 136 thereon (FIGURE 4) which may then engage a stop element or abutment 137 which is shown in the form of a screw in FIGURE 4. Abutment 137 is carried by a bar 140 which extends rearwardly and is suitably secured to transverse frame member 82.

The shield or switch actuator 133 actuates a suitable switch which, in this instance, is shown in the form of a photo-electric cell or phototube 142 spaced to one side of the vertical plane of shield 133 and opposite which a suitable source of light, such as an incandescent lamp 143, is positioned. The phototube 142 and lamp 143 are mounted on a bracket 144 suitably secured to transverse frame member 82 (FIGURES 4 and 6). The electric current transmitted by phototube 142 when the light from lamp 143 impinges thereon may be suitably amplified by an amplifier shown schematically at 145 in FIGURE 12.

The free end of shield 133 is so positioned relative to phototube 142 and lamp 143 that it interrupts the light beam from lamp 143 to phototube 142 during those intervals in which terry pile portions W-2 of web W are in engagement with and are maintaining detector roller 32 in raised position. On the other hand, when a thin band portion W-1 moves into registration with detector roller 32 and permits the same to move downwardly toward the secondary web feed roll 31, shield 133 is moved downwardly and rearwardly to permit the light beam from lamp 143 to impinge upon phototube 142 and to, in effect, close the switch actuated thereby, since it is apparent that the light impinging upon phototube 142 excites the same and permits current to flow therethrough.

Excitation of phototube 142 causes the stop bar 35 of intercepting device 22 to move downwardly into operative position which, in turn, stops the electric motor 103, by means to be presently described.

Whenever current flows through phototube 142, the web feed motor 103 cannot be energized. If the source of supply of the web W becomes exhausted, it may sometimes happen that the operator will hold the web detecting switch 104 (FIGURE 1) in closed position until the then trailing edge of the web has passed through the machine. However, once the latter trailing end of the web passes forwardly beyond the detector roller 32 of the band detecting device 21, the electric motor 103 cannot be energized until the light beam from lamp 143 is subsequently intercepted and stop bar 35 returns to raised position, even though the switch 104 still could be manually held in closed position.

Although the light beam from lamp 143 then could be manually interrupted or the detector roller 32 could be manually raised to move the shield 133 into position between lamp 143 and phototube 142, the present machine is devised to be attended by a single operator. Therefore, a normally inactive auxiliary switch actuator or shield 146 is provided adjacent lamp 143 and phototube 142, and is offset with respect to the shield 133 so the shield 133 may move into position between lamp 143 and phototube 142 while auxiliary shield 146 occupies the same position.

Auxiliary shield 146 normally occupies inoperative position, but moves into operative position between lamp 143 and phototube 142 a short period after the main shield 133 moves to inoperative position out of alinement with the light beam from lamp 143 and each time that detector roller 132 drops into engagement with a corresponding thin band W–1 on the web W.

As best shown in FIGURES 6 and 12, auxiliary shield 146 is fixed on one end of a piston rod 150 having a piston 151 on its upper end mounted for longitudinal sliding movement in a double-acting fluid pressure cylinder 152. Cylinder 152 is fixed on bracket 144 (FIGURES 4 and 6). Opposed ends of cylinder 152 have conduits 153, 154 connected thereto and communicating therewith whose other ends are connected to opposite sides of a suitable electrically operable or solenoid-operated four-way valve 155 (FIGURE 12). Since the fluid pressure medium is compressed air, in this instance, valve 155 has an exhaust port 156 and an inlet a. A pipe or conduit 160 is connected to inlet a of valve 155 and extends to the output side of pressure tank 67. A suitable pressure regulator valve 161 may be interposed in conduit 160 adjacent valve 155.

The movable core of valve 155 has suitable passageways therein (FIGURE 12) for establishing communication between conduit 153 and port 156 and for also establishing communication between inlet a and conduit 154 when the core of valve 155 occupies the position shown in FIGURE 12. On the other hand, when the core of valve 155 is moved by energization of a solenoid 162, the passageways therein establish communication between conduit 154 and exhaust port 156 and also establish communication between conduit 153 and inlet a. The latter core is returned to the original position, as shown in FIGURE 12, by energization of a solenoid 163.

It will be observed in FIGURE 12 that solenoids 162, 163 have respective electrical conductors b, c, and d, e connected to opposite sides of the respective coils thereof. Corresponding ends of conductors b and d are connected to a lead conductor 164. Conductor 164 and another lead conductor 165 extend from a suitable source of electrical energy embodied in a plug 166. A manually operable master switch 167 is interposed in conductors 164, 165 adjacent the plug 166. Conductor c is connected to a medial portion of a conductor 170 leading from one side of phototube 142 through amplifier 145. The other side of phototube 142 has a conductor 171 leading therefrom to lead conductor 165. The lamp 143 is connected to lead conductors 164, 165 by conductors 172, 173.

The end of conductor e opposite from solenoid 163 of valve 155 is connected to one side of a normally open switch 174 associated with the intercepting device 22 in a manner to be later described. Switch 174 is held in closed position to maintain contact between the conductor e and a conductor f wherever the stop bar 35 of intercepting device 22 occupies raised, inactive, position. The end of conductor f opposite from switch 174 is connected to one side of the coil of relay 106, and the other side of the coil of relay 106 has a conductor 175 extending therefrom to lead conductor 165.

It is apparent that, whenever a high portion or terry area W–2 on web W moves out of engagement with detector 32 in the manner heretofore described, detector roller 32 and shield 133 move downwardly to permit the light beam from lamp 143 to impinge upon phototube 142. Thus, current flows from lead conductor 165 through phototube 142, amplifier 145, and conductors 170, c, through solenoid 162 and conductor b to lead conductor 164.

Solenoid 163 previously will have been energized as will be later explained. However, when solenoid 163 is subsequently deenergized, solenoid 162 becomes effective to move the core of valve 155 so that compressed air flows from pressure tank 67, through conduit 160, through valve 155 and conduit 153 to the upper end of cylinder 152. This moves piston 151 downwardly in FIGURES 6 and 12 and causes auxiliary shield 146 to move into active position between lamp 143 and phototube 142. At the same time, compressed air is exhausted from cylinder 152 through conduit 154, valve 155 and exhaust port 156. Even though this deenergizes solenoid 162, the core of valve 155 then remains in the latter position until solenoid 163 is subsequently energized in a manner to be later described.

At the same time that phototube 142 completes the circuit to solenoid 162 of valve 155, it also completes the circuit to a solenoid 176 to cause the stop bar 35 of intercepting device 22 to move downwardly, as will be later described. When stop bar 35 moves downwardly this permits switch 174 to open, thus breaking the circuit to solenoid 163 of valve 155 and to the coil of relay 106. Thereupon, switch 105 opens, thus stopping motor 103 and stopping further feeding of the web W by the feed rolls 30, 31. It will be observed in FIGURE 12 that switches 104, 105 are arranged in series in a conductor g extending from lead conductor 164 to one side of electric motor 103. The other side of electric motor 103 has a conductor 180 leading therefrom to lead conductor 165.

*High surface intercepting device*

As heretofore stated, the intercepting device 22 comprises the stop bar 35 which is normally raised substantially above the level of the web W, is spaced forwardly of the detector roller 32, and is moved to lowered position in close proximity to the upper surface of the auxiliary web feed platform 37 whenever a thin band W–1 of the web W is detected by the detector roller 32. It should be noted that, when the stop bar 35 occupies lowered, active, position, its lower surface is disposed above the level of the corresponding thin portion or band W–1, but is disposed below the level of the upper surface of the subsequent terry area W–2.

Stop bar 35 is in the form of a rectangular plate mounted for angular movement toward and away from the auxiliary web feed platform 37. For purposes of brevity in the description, the stop bar 35 will be described hereinafter as being mounted for vertical upward and downward movement away from and toward the auxiliary web feed platform 37 or the web W. Stop bar 35 extends transversely above the path of travel of the web W and opposed ends thereof are guided for vertical sliding movement in grooved guideways 190, 190' which are parts of a forwardly and rearwardly adjustable carriage C of the intercepting device 22.

Guideways 190, 190' are fixed to respective arms 191, 191' (FIGURES 3, 5, 6, 8 and 11) which extend rearwardly and are suitably secured to respective posts 192, 192' which extend upwardly above the level of guideways 191, 191' and have opposite ends of a transverse carriage bar 193 suitably secured thereto.

In order to assist in maintaining the lower edge of stop bar 35 in parallel relation to the upper surface of the auxiliary web feed platform 37 and to facilitate accuracy in the spaced relationship between stop bar 35 and auxiliary web feed platform 37 when stop bar 35 occupies lowered position, the lower ends of a pair of laterally spaced generally upwardly projecting guide bars 194 are suitably secured to the rear surface of stop bar 35. It will be observed in FIGURE 8 that the two guide bars 194 are spaced inwardly from opposite ends of stop bar 35.

The guide bars 194 are each substantially T-shaped in cross-section and are each guided for substantially vertical movement in a guide block 195. Each guide block 195 is preferably made from a suitable bearing material, nylon or any other molded plastic having self-lubricating properties. Each guide block 195 is suitably secured to an arm 196 (FIGURES 9 and 10) which extends rearwardly and is suitably secured to the transverse carriage bar 193.

Each guide bar 194 has a rearwardly projecting ear 197 on its upper end which is loosely penetrated by an adjustment screw 200 having a pair of nuts 201 threaded thereon and engaging the upper and lower surfaces of the corresponding ear 197. The upper end of each adjustment screw 200 has a hand-wheel or knob 202 fixed thereon. The lower end of each adjustment screw 200 has an abutment 203 thereon which is preferably made from a hard rubber or synthetic plastic material. The abutments 203 are adapted to engage the upper surfaces of the respective arms 196 (FIGURE 10) to correspondingly limit downward movement of stop bar 35 when the same is moved to operative position by means to be presently described. Of course, the abutments 203 are spaced above the corresponding arms 196 when the stop bar 35 occupies raised, inactive position as shown in FIGURE 9.

The lower ends of the posts 192, 192' of carriage C are suitably secured to respective carriage base plates 208, 208' (FIGURES 1, 3, 5, 6, 7, 10 and 11) mounted for sliding adjusting movement upon the respective platform side rails 73, 74. Each carriage base plate 208, 208' is provided with a longitudinal adjustment slot 209 therein which is loosely penetrated by an adjustment screw 210 threaded into the corresponding platform side rail. Each adjustment screw 210 has a knob or hand wheel 211 thereon to facilitate tightening and loosening screws 210 (FIGURES 5 and 11).

Referring to FIGURES 1, 2, 3, 6, 7 and 11, it will be observed that the proximal edges of the carriage base plates 208, 208' have respective dependent flanges 212, 212' thereon which project below the respective web platform side rails 73, 74 and have the forward ends of respective pliable elements or sprocket chains 213, 213' connected thereto. Flange 212' and sprocket chain 213' are shown in FIGURES 2, 3 and 6.

The upper or rear ends of sprocket chains 213, 213' extend over and in engagement with respective sprocket wheels 214, 214' to which the rear ends of the corresponding sprocket chains are pivotally connected (FIGURES 2, 6 and 7). Sprocket wheels 214, 214' are fixed on a transverse shaft 215 journaled in bearing blocks 216, 216' suitably secured to the lower surfaces of the respective platform side rails 73, 74. One end of shaft 215 is coupled to the output of a gear reduction unit 217 fixed to a support 220 (FIGURE 7) extending between and being suitably secured to upright frame member 71 and platform side rail 73 (FIGURES 1, 2 and 7).

The gear reduction unit 217 is manually operated by a hand-wheel 221 for rotating shaft 215 and sprocket wheels 214, 214' for adjusting the carriage C of intercepting device 22 forwardly and rearwardly with respect to the path of travel of web W. It is apparent that the adjustment screws 210 (FIGURE 11) are loosened during such adjustment of carriage C and are then tightened to lock the carriage C in the desired adjusted position.

Referring to FIGURE 1, it will be observed that platform side rail 73 has a row of graduation marks $h$ thereon and the base plate 208 of carriage C has a pointer $k$ thereon which is movable past the graduation marks $h$ during forward and rearward adjustment of carriage C. This enables an operator to accurately determine the position of the stop bar 35 relative to the frame 25 and the cutting blades 40, 41 of the severing device 23 so the stop bar 35 may be accurately positioned to insure that blade 41 will sever the corresponding transverse band W-1 of web W along the center line thereof, for example.

Also, since the structure supported by the carriage base plates 208, 208' is quite heavy and the plates 208, 208' are disposed in a relatively steep angular attitude, the lower portion of each flange 212, 212' has a roller 223 journaled thereon and engaging the lower surface of the corresponding platform side rail 73, 74 (FIGURES 2, 3, 7 and 11). Rollers 223, 223' maintain the base plates 208, 208' of carriage C in engagement with the upper surfaces of platform side rails 73, 74 whenever hand-wheels 221 are turned to loosen the corresponding screws 210 (FIGURE 11) and during forward and rearward adjustment of carriage C.

The stop bar 35 of intercepting device 22 is raised and lowered by means of a double-acting fluid pressure cylinder 230 (FIGURES 1, 3, 5, 7, 8, and 12) fixed to a bar 231 projecting upwardly from and being suitably secured to the transverse carriage bar 193 of carriage C. Cylinder 230 has a piston 232 mounted for longitudinal sliding movement therein and to which the upper end of a piston rod 233 is suitably secured. The lower end of piston rod 233 is connected to a medial portion of stop bar 35 by means of a bifurcated block 234 (FIGURES 6, 7, 8 and 12).

Stop bar 35 carries a pair of switch actuators 235, 236 (FIGURES 6, 8 and 12), the actuator 235 being shown in the form of a plate secured to and projecting rearwardly from a medial portion of stop bar 35 and actuator 236 being shown in the form of an angle plate projecting upwardly from another medial portion of stop bar 35. Switch actuator 235 engages and closes switch 174 while stop bar 35 occupies raised position, and switch actuator 236 engages and closes a normally open switch 237 when stop bar 35 occupies its lowermost position.

The housings of switches 174, 237 are fixed to respective brackets 240, 241 (FIGURE 6) which are preferably adjustably secured to the transverse carriage bar 193. As heretofore stated, switch 174 maintains the flow of current to the main web feed motor 103 and to the solenoid 163 of valve 155 (FIGURE 12) when stop bar 35 is in fully raised position. Closing of the switch 237 when the stop bar 35 reaches its lowermost position in the course of downward movement thereof effects actuation of the movable cutter blade 41 of the severing device 23, as will be later described.

The double-acting cylinder 230 has conduits 245, 246 leading from respective upper and lower ends thereof (FIGURE 12) to opposed sides of a solenoid-operated four-way valve 247 fixed on the upper end of cylinder 230 in FIGURES 7 and 8. In FIGURE 12, valve 247 is shown schematically as being of the same type as valve 155 and includes an exhaust port $m$ positioned opposite from an inlet conduit 250 communicating with the core of valve 247. A suitable pressure regulator valve 251 may be interposed in conduit 250. The end of conduit 250 opposite from valve 247 is connected to a medial portion of conduit 160 at a point spaced between regulator valve 161 and pressure tank 67.

The core of valve 247 is operated by a pair of solenoids or electro-magnetic devices, including the solenoid 176 and a solenoid 253. Energization of the solenoid 253 causes the core of valve 247 to occupy the position shown in FIGURE 12 in which compressed air flows into the lower end of cylinder 230 and is exhausted from the upper end thereof, and energization of solenoid 176 when the solenoid 253 is not energized moves the core of valve 247 to establish communication between inlet pipe 250 and pipe 245 while establishing communication between pipe 246 and exhaust port $m$ so that compressed air then flows into the upper end of cylinder 230 as it is exhausted from the lower end thereof.

Since compressed air must flow into the upper end of cylinder 230 to move stop bar 35 from raised to lowered position, the end of conductor 170 opposite from phototube 142 and amplifier 145 is connected to one side of the coil of solenoid 176 and the other side of this coil has a conductor 254 extending therefrom to the lead conductor 164. It follows, therefore, that both solenoids 162, 176 are energized simultaneously when a band W–1 in web W is detected by detector roller 32 and shield 133 moves out of registration with lamp 143 and phototube 142. However, since both solenoids 162, 163 of valve 155 are momentarily simultaneously energized until stop bar 35 starts to move downwardly, it follows that auxiliary shield 146 does not move into position between lamp 143 and phototube 142 until such time as the movement of the core of valve 247 has been effected by energization of solenoid 176, thus insuring that stop bar 35 is moved downwardly, or starts to move downwardly, before solenoid 162 is rendered effective to move the core of valve 155 to where it will effect movement to the auxiliary shield 146 to move the same into position between lamp 143 and phototube 142. It is apparent that this occurs immediately following the opening of switch 174 which is permitted by downward movement of actuator 235 out of engagement therewith. As heretofore stated, the opening of switch 174 also breaks the circuit to the coil of relay 106 which, in turn, breaks the circuit to electric motor 103.

Means are provided for stopping the machine in the event of any of the transverse thin bands W–1 of web W being so extensively biased that a portion of a succeeding terry pile area W–1 advances to a position beneath the stop bar 35 before the leading edge of that portion of the corresponding band W–1 in longitudinal alinement with detector roller 32 has actually been detected by detector roller 32. Accordingly, the lower front portion of stop bar 35 has a pair of movable feeler bars 260, 260' thereon (FIGURES 6, 8 and 12) which are shown in the form of angle bars (FIGURES 7, 9, 10 and 11). The feeler bars 260, 260' are pivotally connected to the front surface of stop bar 35, adjacent the central portion thereof, as at 262 (FIGURE 8).

The feeler bars 260, 260' extend outwardly and terminate adjacent the respective guideways 190, 190'. The lower surfaces of feeler bars 260, 260' are normally disposed substantially flush with the lower edge of stop bar 35. To this end, the outer end portion of each feeler bar 260, 260' has a vertically extending slot 263 therein which is loosely penetrated by a shoulder screw 264 (FIGURES 8 and 12) which limits downward movement of the corresponding feeler bar relative to stop bar 35 by engagement with the upper end of the corresponding slot 263. The outer end portion of each feeler bar 260, 260' is normally yieldably urged downwardly to the extent permitted by the corresponding screw 264, as by means of a torsion spring 265 suitably secured to the rear surface of stop bar 35 (see the left-hand portion of FIGURE 8).

Now, in the event that there is any portion of a pile area W–2 beneath stop bar 35 in the course of its downward movement, even though the stop bar 35 will crush the corresponding portion of the pile area W–2 in alinement therewith, the springs 265 will permit either feeler bar 260 or 260' which may engage the pile area W–2 to stop as the stop bar 35 continues its downward movement to fully lowered position. When either of the feeler bars 260 or 260' is raised out of its normal position with respect to the stop bar 35, this prevents actuation of the movable blade 41 and, as will be later explained in detail, failure of the movable cutter blade 41 of severing device 23 to operate following downward movement of stop bar 35, causes stop bar 35 to remain in lowered active position, with the result that the main web feed motor 103 remains stopped until such time as the attendant or operator pulls the latter pile area W–2 free of the stop bar 35 to effect normal operation of the apparatus. It is apparent that the feeler bars 260, 260' thus avoid the incorrect cutting of pieces from the web W by the movable cutter blade 41.

The manner in which the feeler bars control the operation of the severing device 23, and the manner in which the severing device is instrumental in effecting the return of the stop bar 35 to raised position will be presently described.

*Severing device*

As heretofore stated, the severing device 23 includes the fixed transverse blade 40 and the movable blade 41 which are preferably spaced forwardly from the rear surface of the stop bar of intercepting device 22 a distance preferably equal to one-half the width of each successive thin band W–1 on the web W. The fixed blade 40 is suitably secured to the front surface of the depending flange on auxiliary web feed platform 37. As best shown in FIGURES 7, 8 and 12, movable blade 41 normally occupies a raised, inactive position above the level of the path of travel of web W and is arranged so that it cooperates with the fixed cutting blade 40 in a guillotine-like or scissors-like manner.

The movable blade or knife 41 is suitably secured to an elongate knife lever shown in the form of an angle bar in FIGURE 7. It will be observed in the right-hand portion of FIGURE 6 that one end of knife lever 270 is fixed on the front or lower end of a pivot shaft 271 which extends substantially parallel with platform side rail 73 and is supported for longitudinal and pivotal movement in a pair of spaced bearing blocks 272. Bearing blocks 272 are suitably secured to an angle bracket 273 (FIGURES 6 and 8) whose front end is welded or otherwise suitably secured to the corresponding end of auxiliary web platform 37. It should be noted that the platform side rail 73 has an opening 274 in its upper portion (FIGURES 1, 7, 10 and 11) to accommodate the corresponding ends of knife 41, lever 270, and auxiliary platform 37.

In order to maintain the blade or knife 41 in yielding engagement with the front surface of fixed blade 40 during the course of each active stroke thereof, shaft 271 has a compression spring 275 thereon, opposed ends of which bear against stop members or collars 276, 277 (FIGURE 6). Collar 276 is fixed on a medial portion of shaft 271 spaced between bearing blocks 272, and collar 277 bears against the lowermost of the bearing blocks 272. Thus, spring 275 applies a rearward yielding pressure to knife lever 270 and knife 41.

The free end of lever 270, remote from pivot shaft 271, has a pair of brackets 280, 281 suitably secured thereto. Bracket 280 extends outwardly in substantially longitudinal alinement with lever 270 and has a pair of spaced guide rollers 282 journaled on opposite sides thereof and engaging the rear surface of an arcuate track 283 (FIGURES 3, 5, 6, 8 and 12). The arc of track 283 is generated about the axis of pivot shaft 271. Bracket 281 has a follower or roller 285 journaled thereon which engages the front surface of track 283. Thus, the rollers 282, 285 assist in maintaining the blade 41 in a staight path during each active and inactive stroke thereof.

Arcuate track 283 is adjustably supported to extend in substantially right angular relation with respect to platform side rail 74 by means of a pair of upright track support bars 286, 287 (FIGURES 3 and 5) whose lower ends are welded or otherwise suitably secured to the upper surface of main side frame member 61. The upper ends of track support bars 286, 287 are each provided with an elongate adjustment slot 290 which is penetrated by a corresponding screw 291 threaded into track 283.

The housings of two spaced normally open switches 293, 294 are suitably secured to the arcuate outer surface of track 283, switch 293 being disposed adjacent the upper or free end of track 283 and switch 294 being disposed at a point substantially midway of the range of travel of bracket 280. The housing of a normally open blade raising switch 295 is disposed adjacent the lower end of track 283 and is suitably secured to the platform side rail 74.

It should be noted that bracket 280 extends outwardly beyond track 283 with respect to knife lever 270 so that its free end portion may engage the actuating arms of the switches 293, 294. The free end portion of bracket 280 also has a lateral extension or switch actuator 297 fixed thereon which is adapted to engage the actuating arm of switch 295 to close the same at the end of each downward or active stroke of cutter blade 41.

When the movable knife or cutter blade 41 occupies inoperative or fully raised position, as shown in FIGURES 3, 8 and 12, the bracket 280 holds the normally open switch 293 in closed position. It will be observed in FIGURE 12 that switch 293 has conductors 300, 301 connected to opposite sides thereof. Conductor 300 extends to one side of a normally open safety switch 302' which has a conductor 303 leading from the other side thereof to lead conductor 165. Conductor 301 extends from switch 293 to one side of switch 237 and the other side of switch 237 has a conductor 305 leading therefrom to one side of the coil of a solenoid p associated with a solenoid-operated four-way valve 306. Four-way valve 306 may be of the same construction as valves 155, 247 heretofore described and also includes a solenoid q.

The end of the coil of solenoid p opposite from that to which conductor 305 is connected has a conductor 310 leading therefrom to one side of a normally open safety switch 320 from the other side of which a conductor 311 extends to the lead conductor 164. The coil of solenoid q associated with valve 306 has a pair of conductors 312, 313 connected to opposite ends thereof. Conductor 312 extends to lead conductor 164 and conductor 313 is connected to one side of the normally open knife-raising switch 295. The other side of switch 295 is connected to lead conductor 165.

The normally open switch 294 is operable to effect upward movement to the stop bar 35 of intercepting device 22. Switch 294 is of a well-known type which is closed only when the actuating arm thereof is moved upwardly by the bracket 280 on the free end of knife lever 270, even though said bracket 280 engages and imparts downward movement to the actuating arm of switch 294 in the course of each downward stroke thereof.

Since the closing of switch 294 is to cause stop bar 35 to move upwardly to inactive position, it will be observed in FIGURE 12 that switch 294 has conductors 315, 316 connected to opposite sides thereof. Conductor 315 extends to lead conductor 165 and conductor 316 extends to one side of the coil of solenoid 253 of the valve 247 associated with intercepting device 22. The other side of the latter coil has a conductor 317 extending therefrom to lead conductor 164.

The four-way valve 306 controls the flow of compressed air to the cylinder 76 which, as heretofore stated, is operatively connected to the movable cutter blade 41 of severing device 23. Accordingly, it will be observed in FIGURES 6 and 8 that the upper end of cylinder 76 is pivotally connected to a bracket 320 fixed to the frame member 75. The valve 306 may be supported on the upper end of cylinder 76 as shown in FIGURE 8.

Cylinder 76 has a piston 321 mounted for longitudinal sliding movement therein. The upper end of a piston rod 322 is suitably secured to piston 321. The lower end of piston rod 322 is pivotally connected to a medial portion of knife lever 270, as at 323 (FIGURES 8 and 12).

It will be observed in FIGURE 12 that the upper and lower ends of cylinder 76 have respective conduits or pipes 324, 325 extending therefrom to opposite sides of valve 306. When the core of valve 306 occupies the position shown in FIGURE 12, conduit 324 communicates with an exhaust port r on valve 306, and conduit 325 communicates with a conduit 327 leading from valve 306 to a medial portion of conduit 160 at a point between regulator valve 161 and pressure tank 67. A suitable pressure regulator valve s may be interposed in conduit 327. When solenoid p of valve 306 is energized, the core of valve 306 is moved so that pipe 324 communicates with pipe 327 and pipe 325 communicates with the exhaust port r. Conversely, when solenoid q is energized, the core of valve 306 is returned to the position shown in FIGURE 12. Since there are many different types of solenoid operated valves, and the construction thereof is well known, a detailed illustration and description of the valves 155, 247, 306 is deemed unnecessary.

In operation, it has already been stated that switch actuator 236 of intercepting device 22 closes switch 237 when the stop bar 35 reaches its lowermost, active, position. Assuming that the blade 41 of severing device 23 then occupies fully raised, inactive position, normally open switch 293 would then be held in closed position by bracket 280. However, safety switches 302, 302' are also interposed in the circuit from the source of electrical energy to the solenoid p of valve 306 and it follows, therefore, that switches 302, 302' must be closed before compressed air may be introduced into the upper end of cylinder 76. Accordingly, the free ends of the feeler bars 260, 260' are provided with respective brackets 330, 330' fixed thereon and which have respective adjustable abutments or set screws 331, 331' mounted therein and overlying switches 302, 302' (FIGURES 8, 11 and 12).

The abutments 331, 331' are so positioned relative to the switches 302, 302' that they will close the respective switches 302, 302' upon stop bar 35 reaching its lowermost or active position, unless there is some obstruction in the path of the feeler bars 260, 260' which causes stop bar 35 to move downwardly relative to either of the feeler bars 260, 260' as it approaches the end of an active stroke thereof. As heretofore stated, a thin band W–1 on web W could be so excessively biased that a portion of a pile area W–2 could be positioned beneath the stop bar 35 before the corresponding band is detected or while a corresponding band is being detected by the detector roller 32 of the band detecting device 21.

However, assuming that there is no interruption in the downward movement of either of the feeler bars 260, 260' with the stop bar 35, it is apparent that the switches 302, 302' are closed as the stop bar 35 reaches its lowermost position in the course of an active stroke thereof. It will be observed in FIGURES 8 and 11 that the normally opened switches 302, 302' are suitably secured to the front surfaces of the guideways 190, 190'.

Upon all the switches 237, 293, 302 and 302' being closed in the manner heretofore described, it is apparent by referring to FIGURE 12 that the solenoid p is energized and moves the core of valve 306 from the position shown in FIGURE 12 to a position establishing communication between conduits 327, 324 and between the conduit 325 and exhaust port r, respectively. Thus, compressed air flows into the upper end of cylinder 76 as it is exhausted from the lower end thereof and an active downward stroke is imparted to the cutter blade 41. Although bracket 280 moves out of engagement with switch 293, the core of valve 306 remains in the latter position until blade 41 reaches its lowermost position and the switch actuator 297 (FIGURES 5 and 12) on bracket 280 engages and closes the knife raising switch 295.

It is apparent that the closing of switch 295 completes the circuit to the solenoid q of FIGURE 12 and returns the core of valve 306 to the position shown in FIGURE 12. Thus, compressed air enters the lower end of cylinder 76 and is exhausted from the upper end thereof to return blade 41 to inoperative or raised position. During the course of upward movement of blade 41, the bracket 280 engages and momentarily closes switch 294, thus completing the circuit to the solenoid 253.

Since the solenoid 176 will have been deenergized by this time, due to the successive movements of auxiliary shield 146 and main shield 133 into position between lamp 143 and phototube 142, it is apparent that energization of solenoid 253 returns the core of valve 247 to the position shown in FIGURE 12 so that compressed air enters the lower end of cylinder 230 as it is exhausted from the upper end thereof and thus causes the stop bar 35 to return to fully raised position. In so doing, switches 237, 302, 302' are permitted to open and switch 174 is closed.

Assuming that the supply of web material W has not been exhausted, and that detector roller 32 will have been raised by a corresponding terry pile area as the leading edge thereof was advanced to a position against the rear surface of stop bar 35 by belts 43 and rollers 45 of the auxiliary web advancing device 24, the shield 133 will then occupy a position between lamp 143 and phototube 142. Thus, both solenoids 162, 163 of valve 155 will have been deenergized and the closing of switch 174 with upward movement of stop bar 35 to inactive position will cause energization of the coil of relay 106 and the solenoid 163. In so doing, switch 105 will be closed to complete the circuit to electric motor 103 so that a succeeding portion of the web W is then fed past the band detecting device 21, the intercepting device 22 and the severing device 23 as the core of valve 155 is returned to the position in which it is shown in the upper portion of FIGURE 12 to withdraw the auxiliary shield 146 from between lamp 143 and phototube 142. A cycle in the operation of the web feed rolls 30, 31, the band detecting device 21, the intercepting device 22 and the severing device 23 then has been completed and a succeeding cycle thereof is again initiated upon a succeeding thin band W-1 of web W being detected by detector roller 32 in the manner heretofore described.

As heretofore stated, as each successive article A is severed from the web, it is quickly pulled away from the main portion of the web due to the relatively high speed of the belts 43 and also due to the fact that the web feed rolls 30, 31 are then stationary. Of course, as soon as the severing of an article A from web W has been effected and the various parts of the band detecting device 21, the intercepting device 22 and the severing device 23 have returned to the proper inoperative or inactive positions heretofore described, the web W is advanced by the rollers 30, 31 and the free front edge of the web then falls onto the upper runs of conveyor belts 43.

Since the conveyor belts 43 operate at a substantially greater surface speed than the speed at which the web is advanced by the feed rollers 30, 31 the edge of the web which engages the upper runs of the belts 43 is snapped forwardly and drawn beneath the web guide bar 50. It is apparent, therefore, that the belts 43 move relative to the web, but impart forward movement to the web at a speed corresponding to the speed at which the web is being fed by the rollers 30, 31 until such time as the web is restrained by engagement of the leading edge of a succeeding terry area W-2 with stop bar 35.

*Auxiliary web advancing device 24*

As heretofore stated, the upper runs of conveyor belts 43 extend rearwardly of the vertical plane of the upper forward edge of the fixed blade 40 of severing device 23, and the upper runs of the conveyor belts 43 are supported in the desired spaced relation to the shaft 46, on which floating rollers 45 are mounted, by means of a plate 86 carried by the frame members 87, 88. The rear portions of conveyor belts 43 are mounted on a roller 340, and the front portions of conveyor belts 43 are mounted on a roller 341. Reduced opposed ends of conveyor rollers 340, 341 are journaled in suitable bearings 342, 343 (FIGURE 1) fixed on the longitudinal main side frame members 60, 61.

The conveyor rollers 340, 341 may each be provided with suitable annular ridges 344 spaced along the length thereof, as shown in association with the roller 340 in FIGURE 2, for maintaining the belts 43 in spaced relationship preferably corresponding to the spaced relationship of the floating presser rollers 45. As shown in FIGURE 6, adjacent presser rollers 45 may be maintained in the desired spaced relationship by corresponding collars or sleeves 345 mounted on shaft 46.

Front conveyor roller 341 may be driven by means of an endless belt 346 mounted on a pulley 347 fixed on the output shaft of an electric motor 350. Electric motor 350 is fixed on a suitable motor support 351 carried by frame 25.

Referring to FIGURE 13, it will be observed that conveyor motor 350 has conductors 352, 353 connected to opposite sides thereof and leading to a suitable source of electrical energy embodied in a plug or electrical connector 354. A manually operable switch 355 may be provided in conductor 352 for controlling the operation of electric motor 350. As heretofore stated, the conveyor belts 43 are driven to rotate at a substantially faster speed than the speed at which the web W is fed onto the conveyor belts 43 by the feed rolls 30, 31. However, since the conveyor belts 43 may rotate continuously, electric motor 350 need not be positioned in the same electrical circuit as the electric motor 103, and the speed of electric motor 350 is not critical provided that it rotates the roller 341 so as to impart movement to the conveyor belts 43 at a speed substantially exceeding the speed at which the web is fed by the rolls 30, 31 (FIGURE 7).

It is thus seen that we have provided a novel method and apparatus for carrying out the method for severing pieces or articles from a continuous web having transversely extending successive portions of different heights, with means for detecting the presence of any transverse areas or bands of a height below a given height and wherein the stop bar 35 of the high surface intercepting device 22 includes means automatically responsive to the detection of a portion of lesser height than said given height for moving the stop bar downwardly to a position closely spaced above the path of travel of the relatively lower portion of the web. It is seen further that we have provided means, independently of the main web feed, for advancing the web at independently spaced points along its width so that the leading edge of the subsequent relatively higher surface is moved against the stop bar 35 and thus positioned in straight transverse or right-angular relation to the path of travel of the web in the event that any portion or portions of the web may have been biased, skewed, bowed or irregular along the width thereof, thus insuring that the corresponding portion of the web is accurately positioned for severing the same, and wherein the severing device operates in response to the proper positioning of a relatively thin or low surface portion of the web for severing the web in the desired relation to the portion of the web thus straightened.

Although a particularly novel and useful type of band detecting device has been described herein, it is contemplated that other means may be used for detecting the presence of relatively thin transverse bands in the moving web W and for effecting operation of the intercepting and straightening device 22, without departing from the spirit of the invention. For example, the web may be moved substantially half way around a transverse bar positioned in advance of the intercepting device 22, with a source of light projecting a beam of light past and closely adjacent the bar and toward a phototube, so that movement of a thin area, such as a band W-1, in engagement with the bar will permit the light beam from the light source to impinge upon the corresponding phototube to then effect operation of the stop bar 35 in the same manner as the phototube 142 effects operation thereof. In the latter instance, the high portions or pile areas on the web W moving in engagement with the transverse bar would serve to shield the corresponding phototube from the light source and shields such as are indicated at 133, 146 would not then be required.

In the drawings and specification there has been set forth a preferred embodiment of the invention and, although specific terms are employed, they are used in a generic and descriptive sense only and not for purposes of limitation, the scope of the invention being defined in the claims.

We claim:

1. A method of severing articles from a continuous length of textile web material having recurrent non-uniformly spaced relatively narrow and relatively low transverse bands thereon and intervening relatively high terry pile areas between successive bands; said method comprising
   (a) moving the web forwardly in a substantially straight path of travel,
   (b) detecting each successive band as it reaches a particular position in its travel,
   (c) contacting and arresting the leading edge of each successive terry pile area as it reaches a point adjacent said position and in response to detection of the corresponding band extending forwardly from each successive terry pile area,
   (d) advancing any portions of each successive leading edge not previously transversely alined at said point so the corresponding leading edge extends in a straight transverse line, and
   (e) severing said web along each successive band extending forwardly from the particular leading edge alined at said point.

2. A method of severing individual pieces, such as towels, from a length of terry web material having recurrent non-uniformly spaced transverse bands of one height and intervening transverse terry pile areas of greater height extending between successive bands; said method comprising
   (a) directing the web in a given path of travel,
   (b) contacting and arresting at least a portion of the leading edge of each successive terry pile area of greater height as the same reaches a predetermined point in its travel and at which time a corresponding transverse band extends from and beyond said point,
   (c) engaging the web at a plurality of portions substantially throughout the width thereof and applying independent yielding advancing forces to said engaged portions to advance and transversely aline any portions of each successive leading edge not previously alined at said point, and
   (d) severing said web transversely at that band corresponding to each successive leading edge alined at said point.

3. A method of severing individual articles, such as towels, from a continuous length of pliable web material having recurrent transverse band portions of a thickness different from its portions between said band portions; said method comprising
   (a) moving the web in a given path of travel,
   (b) detecting each successive transverse band portion,
   (c) placing an elongate substantially straight obstruction in the path of the thicker of said portions at each successive band portion so detected substantially throughout the width of the web,
   (d) engaging the web at a plurality of portions substantially throughout the width thereof and applying independent yielding pulling forces to the engaged portions of the web in directions corresponding to, and generally parallel with, the direction of travel of said web to pull any portions of the corresponding thicker portion of the web not previously moved against said obstruction against the same to straighten the corresponding band portion, and
   (e) severing the web substantially parallel with and along each successive band portion corresponding to the particular thicker portion then straightened against said obstruction.

4. A method of straightening spaced, recurrent, thin transverse bands in a length of toweling having terry pile areas between successive bands which are thicker than said bands; said method comprising
   (a) directing the toweling in a given path of travel,
   (b) contacting and arresting at least a portion of the leading edge of each successive terry pile area as the same reaches a predetermined point in its travel and at which time a corresponding band extends from and beyond said point, and
   (c) engaging the toweling at a plurality of portions substantially throughout the width thereof and applying independent yielding advancing forces to said engaged portions to advance and aline any portions of each successive leading edge not previously transversely alined at said point.

5. A method of straightening successive, spaced, transverse bands on a length of toweling having terry pile areas of greater height than and extending between adjacent bands; said method comprising
   (a) feeding said length of toweling forwardly in a substantially straight path,
   (b) placing a straight transverse obstruction in the path of the leading edge of each successive terry pile area upon the same reaching a predetermined point in the path of travel of said length of toweling,
   (c) stopping the feeding of said toweling as each successive leading edge reaches said point, and
   (d) engaging said toweling at a plurality of portions substantially throughout the width thereof and forwardly of said point and applying independent yielding pulling forces forwardly to the engaged portions to pull any portions of the corresponding leading edge not previously moved against said obstruction against the same to straighten the last-named leading edge.

6. Apparatus for severing individual pieces, such as towels, from a length of terry fabric having non-uniformly spaced recurrent relatively narrow transverse bands of one height and intervening transverse terry pile areas of greater height extending between successive bands; said apparatus comprising
   (a) means for directing the fabric forwardly in a given path of travel,
   (b) means for contacting and arresting at least a portion of the leading edge of each successive terry pile area of greater height as the same reaches a predetermined point in its travel and at which time a corresponding band extends forwardly from and beyond said point,
   (c) means for engaging said fabric at a plurality of portions substantially throughout the width thereof and applying independent yielding advancing forces to said engaged portions and being operable to advance and transversely aline any portions of each successive leading edge not previously alined at said point, and
   (d) means for severing each successive band transversely of said fabric in close proximity to said contacting and arresting means such as to sever that band extending forwardly from the particular leading edge alined at said point in each instance.

7. Apparatus for severing individual articles, such as towels, from a continuous length of fabric having longitudinally spaced recurrent transverse band portions of a thickness different from body portions between said band portions; said apparatus comprising
   (a) means for feeding the fabric in a given path of travel,
   (b) a straight transverse stop bar movable into the path of the thicker of said portions as each successive band portion moves adjacent to said stop bar,
   (c) movable pulling means located forwardly of said stop bar and tending to pull forwardly a plurality of portions of the fabric widthwise thereof and independently of each other in slipping engagement therewith at a faster speed than the speed at which the fabric is fed by said feeding means to thereby pull corresponding portions of the succeeding thicker of said portions of the fabric against said stop bar to straighten the leading edge of the corresponding thicker portion, and (d) means for transversely severing the fabric closely adjacent said leading edge thus straightened.

8. Apparatus according to claim 7; wherein said movable pulling means (c) comprises
(1) a transverse row of freely rotatable presser rolls adapted to rest upon said fabric,
(2) a plurality of forwardly movable members positioned transversely of and beneath said presser rolls and over which said fabric passes, and
(3) means for driving said members at a faster surface speed than the speed at which the fabric is fed by said feeding means.

9. A structure according to claim 7; in which said movable pulling means (c) comprises
(1) a plurality of driven belts arranged in substantially parallel relationship and adapted to be engaged by said fabric, and
(2) means independently applying yielding pressure to the fabric and toward respective belts to cause respective belts to apply a yielding pulling force to respective portions of the fabric engaged thereby.

10. A structure according to claim 9; including a forwardly and downwardly inclined platform upon which said fabric is fed and having its lower portion terminating above and in spaced relation to said belts, said feeding means (a) comprising
(1) a driven main feed roll for feeding the fabric onto said platform,
(2) a secondary feed roll disposed beneath and adjacent the lower edge of said platform and having its periphery substantially flush with the upper surface of said platform, and adjacent said stop bar, and
(3) means for driving said secondary roll at a higher surface speed than that of said main roll.

11. Apparatus for straightening successive spaced transverse bands on a length of toweling, having terry pile areas of greater height than and extending between adjacent bands, and for severing articles from the toweling; said apparatus comprising
(a) means for feeding said length of toweling forwardly in a substantially straight path,
(b) a substantially straight transverse stop bar normally spaced outwardly from the path of travel of the toweling,
(c) means for moving said transverse stop bar into the path of the leading edge of each successive terry pile areas upon a corresponding band moving into registration with said transverse stop bar,
(d) means for stopping the feeding of said toweling as said transverse stop bar is moved into the path of the leading edge of each successive terry pile area,
(e) means operable automatically for pulling said toweling forwardly at a plurality of portions along its width until the entire leading edge of the corresponding terry pile area is positioned against the transverse bar to straighten the last-named leading edge, and
(f) means for severing the toweling substantially parallel with the leading edge thus straightened and along the center-line of the corresponding band to separate an article from the length of toweling.

12. Apparatus for severing individual pieces, such as towels, from a continuous length of fabric having successive transverse defining lines on said length, and wherein said defining lines are of lesser thickness than body portions of the length between adjacent lines, said apparatus comprising (a) a platform,
(b) a main feed device for feeding said fabric forwardly along one face of said platform,
(c) a transverse stop bar normally occupying an inactive position spaced from the path of travel of said fabric,
(d) a detecting device spaced rearwardly from said transverse stop bar and including means for detecting each successive defining line on said fabric as each line moves into registration with said detecting device,
(e) means responsive to the detection of each successive defining line by said detecting device for moving said stop bar into active position in close proximity to, but spaced from, the fabric at said line and into the path of travel of the next succeeding body portion of said fabric,
(f) means automatically operable for stopping said main feed device when said stop bar moves to said active position,
(g) means spaced forwardly from said stop bar for engaging and applying yielding pulling forces forwardly to a plurality of sections of the fabric along the width thereof and independently of each other to position the full length of the leading edge of the corresponding body portion of the fabric against the read surface of said stop bar, and
(h) means spaced a relatively short distance forwardly from said transverse stop bar and extending substantially parallel therewith for severing the fabric along each successive defining line while the leading edge of the corresponding body portion rearwardly thereof is against said stop bar.

13. Apparatus for severing individual pieces, such as towels, from a continuous length of fabric having successive transverse defining lines on said length, and wherein said defining lines are of lesser thickness than body portions of the length between adjacent lines, said apparatus comprising
(a) a platform,
(b) an electrically operable feed device for feeding said fabric forwardly along one face of said platform,
(c) a transverse stop bar normally occupying an inactive position spaced from the path of travel of said fabric,
(d) a detecting device spaced rearwardly from said transverse stop bar and including a first switch means, and means for detecting each successive defining line on said fabric and operating said switch means as each line moves into registration with said detecting device,
(e) electrically operable responsive means interposed in an electrical circuit with said switch means and being responsive to the operation of said switch means by said detecting device for moving said stop bar into active position in close proximity to the fabric at said line and into the path of travel of the next succeeding body portion of said fabric,
(f) normally open second switch means in an electrical circuit to said feed device and closable by said stop bar only when the same is spaced from the path of travel of the fabric whereby said second switch means is opened to stop the feed device whenever said stop bar moves to said active position,
(g) means spaced forwardly from said stop bar for pulling forwardly a plurality of sections of the fabric until the full length of the leading edge of the corresponding body portion of the fabric is pulled against the rear surface of said stop bar, and
(h) means spaced a predetermined distance forwardly from said transverse stop bar and extending substantially parallel therewith for severing the fabric and comprising
(1) a transverse cutter blade normally occupying an inactive position spaced from the path of travel of the fabric, (2) electrically operable means for moving said blade to an active position through the fabric and for then returning said blade to inactive position, (3) third normally open switch means interposed in an electrical circuit to said last-named electrically operable means for effecting movement of said blade to active position when said third switch means is closed, and (4) means responsive to movement of said stop bar to active position for closing said third switch means.

14. A structure according to claim 13 including means automatically operable following completion of each movement of said blade to active position for returning said stop bar to said inactive position.

15. A structure according to claim 13 including at least one feeler bar movably supported by said stop bar and normally being substantially flush with the surface of said stop bar nearest the path of travel of said fabric, said feeler bar being movable relative to said stop bar in the event of a portion of any of said body portions of the fabric being engaged by the feeler bar as said stop bar moves from inactive to active position, and a fourth normally open switch means in series with said third switch means and being closable by said feeler bar only when the same is substantially flush with said stop bar whereby the third switch means will not effect movement of said blade to active position whenever a body portion of the fabric is engaged by the feeler bar as said stop bar is moved to active position.

16. Apparatus for straightening successive spaced transverse bands on a length of web material having transverse areas of greater height than and extending between adjacent bands; said apparatus comprising (a) means for feeding said web material forwardly in a substantially straight path, (b) a substantially straight transverse stop bar normally spaced outwardly from the path of travel of the web material, (c) means for moving said transverse stop bar into the path of the leading edge of each successive greater height area upon each corresponding band moving into registration with said transverse stop bar, (d) means for stopping the feeding means each time said transverse stop bar is moved into the path of the leading edge of each successive greater height area, and (e) means operable automatically for applying an independent forward pulling force to said web material at each of a plurality of portions along its width and forwardly of said stop bar to pull the entire leading edge of each successive greater height area against the transverse bar to straighten the last-named leading edge.

References Cited by the Examiner
UNITED STATES PATENTS

| | | | |
|---|---|---|---|
| 695,553 | 3/02 | Heany | 83—371 |
| 1,504,130 | 8/24 | MacBeth et al. | 83—418 |
| 2,180,903 | 11/39 | Jensen | 83—253 X |
| 2,655,842 | 10/53 | Baumgartner | 83—110 X |
| 2,797,753 | 7/57 | Borneman | 83—371 |
| 2,798,549 | 7/57 | Feitl | 83—253 |
| 2,838,112 | 6/58 | Feitl | 83—110 X |
| 2,971,414 | 2/61 | Owen | 83—110 X |
| 3,007,359 | 11/61 | Lang et al. | 83—418 X |

ANDREW R. JUHASZ, *Primary Examiner.*

WILLIAM W. DYER, Jr., *Examiner.*

UNITED STATES PATENT OFFICE
CERTIFICATE OF CORRECTION

Patent No. 3,182,536                         May 11, 1965

Charles B. Sumpter, Jr., et al.

It is hereby certified that error appears in the above numbered patent requiring correction and that the said Letters Patent should read as corrected below.

In the grant, line 3, and in the heading to the printed specification, line 7, for "Rockingham", each occurrence, read -- Spray --; column 9, line 70, for "wherever" read -- whenever --; column 14, line 62, for "staight" read -- straight --; column 15, line 33, for "320" read -- 302 --; column 22, line 27, for "read" read -- rear --.

Signed and sealed this 28th day of September 1965.

(SEAL)
Attest:

ERNEST W. SWIDER                         EDWARD J. BRENNER
Attesting Officer                          Commissioner of Patents